(12) United States Patent
Tsubaki

(10) Patent No.: US 10,239,554 B2
(45) Date of Patent: Mar. 26, 2019

(54) ELECTRIC POWER STEERING APPARATUS

(71) Applicant: NSK LTD., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/743,791

(22) PCT Filed: Jun. 6, 2017

(86) PCT No.: PCT/JP2017/020958
§ 371 (c)(1),
(2) Date: Jan. 11, 2018

(87) PCT Pub. No.: WO2017/213130
PCT Pub. Date: Dec. 14, 2017

(65) Prior Publication Data
US 2018/0201306 A1    Jul. 19, 2018

(30) Foreign Application Priority Data

Jun. 6, 2016 (JP) .................................. 2016-113068

(51) Int. Cl.
*B62D 5/04* (2006.01)
*B62D 6/00* (2006.01)

(52) U.S. Cl.
CPC ............ *B62D 5/0463* (2013.01); *B62D 5/04* (2013.01); *B62D 5/0409* (2013.01); *B62D 6/00* (2013.01); *B62D 6/002* (2013.01)

(58) Field of Classification Search
CPC ........ B62D 5/04; B62D 5/0409; B62D 5/046; B62D 5/0463; B62D 6/00; B62D 6/002
See application file for complete search history.

(56) References Cited

U.S. PATENT DOCUMENTS

2001/0054519 A1 * 12/2001 Nishiwaki .............. B62D 1/286
180/167
2006/0089770 A1 * 4/2006 Ito .......................... B62D 1/286
701/41
(Continued)

FOREIGN PATENT DOCUMENTS

JP          2004-017881 A      1/2004
JP          2004256076 A   *   9/2004
(Continued)

OTHER PUBLICATIONS

JPO machine translation of JP 2004-256076 (original JP document published Sep. 16, 2004) (Year: 2004).*
(Continued)

*Primary Examiner* — Behrang Badii
*Assistant Examiner* — David A Testardi
(74) *Attorney, Agent, or Firm* — Sughrue Mion, PLLC

(57) ABSTRACT

An electric power steering apparatus includes a steering angle control section that calculates a steering angle control current command value for the steering angle control, calculates the current command value using at least the steering angle control current command value; the steering angle control section includes a position control section that calculates a basic steering angular velocity command value, a steering intervention compensating section that obtains a compensatory steering angular velocity command value, and a steering angular velocity control section that calculates the steering angle control current command value by the basic steering angular velocity command value, the compensatory steering angular velocity command value and an actual steering angular velocity; the steering intervention compensating section includes a compensation gain section that multiplies the steering torque by a steering intervention compensation gain, and obtains the compensatory steering (Continued)

angular velocity command value by the steering torque through the compensation gain section.

19 Claims, 29 Drawing Sheets

(56) References Cited

U.S. PATENT DOCUMENTS

| | | | | |
|---|---|---|---|---|
| 2013/0041557 | A1* | 2/2013 | Endo | B62D 6/002 |
| | | | | 701/42 |
| 2015/0191199 | A1* | 7/2015 | Tsubaki | B62D 1/286 |
| | | | | 701/42 |
| 2015/0191200 | A1* | 7/2015 | Tsubaki | B62D 15/0285 |
| | | | | 701/42 |
| 2016/0167702 | A1* | 6/2016 | Morimoto | B62D 5/0469 |
| | | | | 701/41 |

FOREIGN PATENT DOCUMENTS

| | | | |
|---|---|---|---|
| JP | 3912279 B2 | | 5/2007 |
| JP | 3917008 B2 | | 5/2007 |
| JP | 2008-013005 A | | 1/2008 |
| JP | 2014054885 A | * | 3/2014 |
| WO | 2014/136515 A1 | | 9/2014 |
| WO | WO-2014/136515 A1 | * | 9/2014 |
| WO | 2014/162769 A1 | | 10/2014 |
| WO | WO-2014/162769 A1 | * | 10/2014 |

OTHER PUBLICATIONS

International Search Report for PCT/JP2017/020958 dated Sep. 5, 2017 [PCT/ISA/210].

* cited by examiner

PRIOR ART

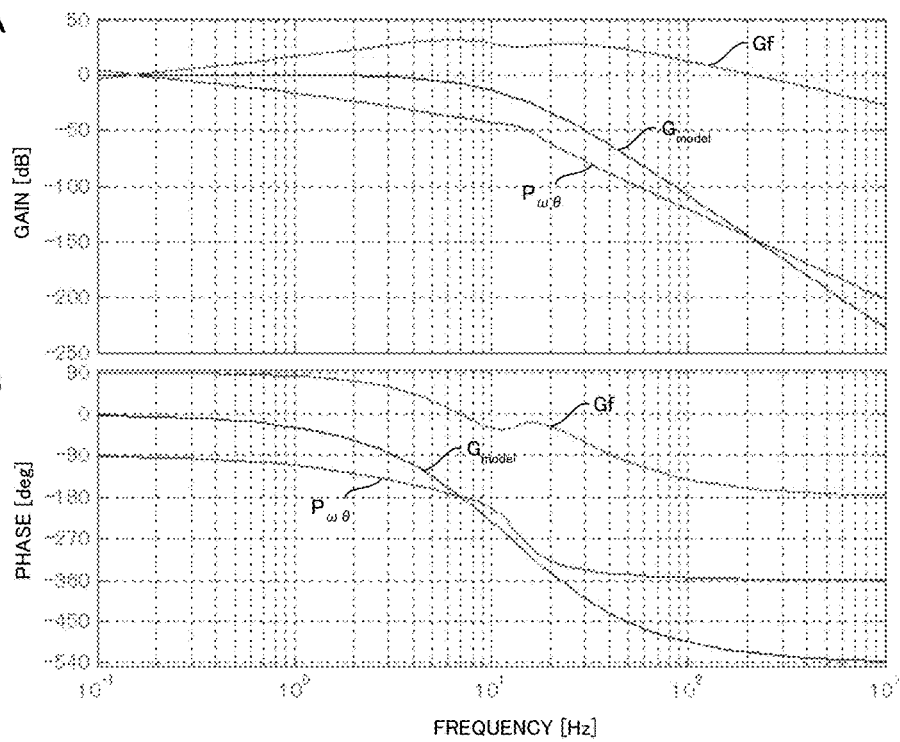
FIG.35A
FIG.35B
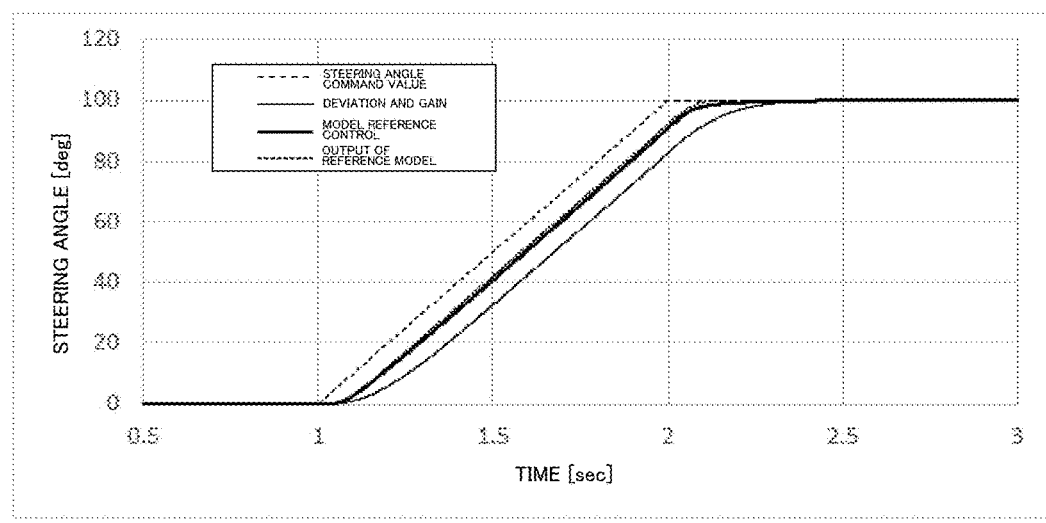
FIG.36

ELECTRIC POWER STEERING APPARATUS

CROSS REFERENCE TO RELATED APPLICATIONS

This application is a National Stage of International Application No. PCT/JP2017/020958, filed on Jun. 6, 2017, which claims priority from Japanese Patent Application No. 2016-113068, filed on Jun. 6, 2016, Japanese Patent Application No. 2016-248976, filed on Dec. 22, 2016, and Japanese Patent Application No. 2017-029273, filed on Feb. 20, 2017, the contents of all of which are incorporated herein by reference in their entirety.

TECHNICAL FIELD

The present invention relates to an electric power steering apparatus that enables automatic steering by performing assist control and steering angle control to a steering system by driving and controlling a motor based on a current command value, and in particular to an electric power steering apparatus that enables safety and reduction of uncomfortable feeling even if steering intervention is performed by a driver during the automatic steering.

BACKGROUND ART

An electric power steering apparatus (EPS) which provides a steering system of a vehicle with a steering assist torque (an assist torque) by means of a rotational torque of a motor, applies a driving force of the motor as the steering assist torque to a steering shaft or a rack shaft by means of a transmission mechanism such as gears or a belt through a reduction mechanism, and performs assist control. In order to accurately generate the assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel 1 is connected to steered wheels 8L and 8R through reduction gears (worm gears) 3 constituting the reduction mechanism, universal joints 4a and 4b, a rack-and-pinion mechanism 5, and tie rods 6a and 6b, further via hub units 7a and 7b. In addition, a torsion bar is inserted into the column shaft 2, for which a steering angle sensor 14 for detecting a steering angle θ of the steering wheel 1 by means of a twist angle of the torsion bar and a torque sensor 10 for detecting a steering torque Tt are provided, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist control command on the basis of the steering torque Tt detected by the torque sensor 10 and a vehicle speed V detected by a vehicle speed sensor 12, and controls a current supplied to the motor 20 by means of a voltage control command value Vref obtained by performing compensation or the like to the current command value.

Moreover, the steering angle sensor 14 is not essential, it does not need to be provided, and it is possible to obtain the steering angle from a rotational angle sensor such as a resolver connected to the motor 20.

A controller area network (CAN) 40 exchanging various information of a vehicle is connected to the control unit 30, and it is possible to receive the vehicle speed V from the CAN 40. Further, it is also possible to connect a non-CAN 41 exchanging a communication, analog/digital signals, a radio wave or the like except with the CAN 40 to the control unit 30.

The control unit 30 mainly comprises a CPU (including an MPU, an MCU and so on), and general functions performed by programs within the CPU are shown in FIG. 2.

The control unit 30 will be described with reference to FIG. 2. As shown in FIG. 2, the steering torque Tt detected by the torque sensor 10 and the vehicle speed V detected by the vehicle speed sensor 12 (or from the CAN 40) are inputted into a current command value calculating section 31 that calculates a current command value Iref1. The current command value calculating section 31 calculates the current command value Iref1 that is a control target value of a current supplied to the motor 20 on the basis of the inputted steering torque Tt and vehicle speed V and by using an assist map or the like. The current command value Iref1 is inputted into a current limiting section 33 through an adding section 32A. A current command value Irefm the maximum current of which is limited is inputted into a subtracting section 32B, and a deviation I (=Irefm−Im) between the current command value Irefm and a motor current Im being fed back is calculated. The deviation I is inputted into a proportional integral (PI) control section 35 for improving a characteristic of the steering operation. The voltage control command value Vref whose characteristic is improved by the PI-control section 35 is inputted into a PWM-control section 36. Furthermore, the motor 20 is PWM-driven through an inverter 37. The motor current Im of the motor 20 is detected by a motor current detector 38 and is fed back to the subtracting section 32B. The inverter 37 is comprised of a bridge circuit of field effect transistors (FETs) as semiconductor switching elements.

A rotational angle sensor 21 such as a resolver is connected to the motor 20, and a rotational angle θ is detected and outputted by the rotational angle sensor 21.

Further, a compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 34C and an inertia 34B at an adding section 34D, further adds the result of addition performed at the adding section 34D with a convergence 34A at an adding section 34E, and then outputs the result of addition performed at the adding section 34E as the compensation signal CM.

Research and development of automatic driving technique of a vehicle has been recently advanced, and proposals where an electric power steering apparatus (EPS) is applied to automatic steering included in the technique, have been made. In the case of achieving automatic steering by the EPS, the EPS has a mechanism for assist control performed by a conventional EPS and a mechanism for steering angle control of controlling a steering system so that a vehicle drives in a desired direction independently, and is generally configured so as to make outputs of these mechanisms possible to adjust. In the steering angle control, position and velocity control having superior performance of responsiveness to a steering angle command being a control target of a steering angle and a disturbance suppression characteristic to a road surface reaction force and so on, is used, for example, a proportional (P) control is adopted in position control, and a proportional integral (PI) control is adopted in velocity control.

In the case of performing the assist control and the steering angle control independently and performing the whole control by switching command values being outputs of both controls, switching them by a switch or the like suddenly may cause uncomfortable feeling to a driver because the command value is suddenly changed and behavior of a steering wheel becomes unnatural. In order to deal with this problem, in the case of switching between a torque control method (corresponding to the assist control) and a rotational angle control method (corresponding to the steering angle control), an apparatus disclosed in Japanese Unexamined Patent Publication No. 2004-17881 A (Patent Document 1) sets a value obtained by multiplying respective command values of both methods by coefficients (an automatic coefficient and a manual coefficient) and adding the multiplication results on a final command value, gradually changes these coefficients, and suppresses an abrupt change of the command value. The apparatus uses a P-control in position control of the rotational angle control method, and uses a PI-control in velocity control.

In the publication of Japanese Patent No. 3917008 B2 (Patent Document 2), an automatic steering control apparatus is proposed that automatically performs a steering wheel operation depending on a set steering angle and aims at parking assist in particular. This apparatus can switch between a torque control mode (corresponding to the assist control) and a parking assist mode (corresponding to the steering angle control), and performs the control by using prestored parking data in the parking assist mode. Further, the apparatus performs a P-control in position control of the parking assist mode, and performs a PI-control in velocity control.

The publication of Japanese Patent No. 3912279 B2 (Patent Document 3) does not directly apply the EPS, however, when an apparatus disclosed in Patent Document 3 starts steering angle control by switching a mode to an automatic steering mode, the apparatus reduces uncomfortable feeling to a driver caused by an abrupt change of a steering wheel at the start by gradually increasing a steering velocity (a steering angular velocity).

THE LIST OF PRIOR ART DOCUMENTS

Patent Documents

Patent Document 1: Japanese Unexamined Patent Publication No. 2004-17881 A
Patent Document 2: Japanese Patent No. 3917008 B2
Patent Document 3: Japanese Patent No. 3912279 B2

SUMMARY OF THE INVENTION

Problems to be Solved by the Invention

However, in Patent Document 1, since a command value for the steering angle control (a steering angle control command value) is limited by the coefficient and is outputted to the final command value while the method is switched, the final command value decreases by the limited amount. Since an actual velocity of a motor becomes slow because of this limitation compared with a command value for a steering angular velocity (a steering angular velocity command value) calculated by the steering angle control command value, a deviation occurs between the steering angular velocity command value and the actual velocity, an integral value of an integral (I) control in the velocity control accumulates, and a larger steering angle control command value is outputted from the velocity control. As a result, since the limitation by the coefficient is relaxed in the state where the coefficient by which a command value for the assist control (an assist control command value) is multiplied gradually increases, the steering angle control command value becomes an excessive value as the coefficient increases, a steering wheel reacts to the steering angular velocity command value excessively, and it may cause uncomfortable feeling such as catching feeling and unpleasantness to a driver.

Further, the apparatus disclosed in Patent Document 1 uses the P-control in the position control and the PI-control in the velocity control. When manual input of a driver intervenes in the steering angle control, the steering angle control operates so as to follow the steering angle control command value, and it is difficult to steer by hand until the switching from the steering angle control to the assist control is performed. Further, time delay occurs by detecting the manual input and switching, and the operation for steering intervention by a driver may not be performed sufficiently.

The apparatus disclosed in Patent Document 2 also performs the steering angle control by using the P-control in the position control and the PI-control in the velocity control. In the case of performing the steering angle control in a vehicle, a disturbance and a load state are significantly changed by a vehicle speed, friction, change of a road surface reaction force and so on, so that an apparatus must have a control configuration being resistant to them. However, in the control configuration of the apparatus described in Patent Document 2 alone, for example, in the case that the road surface reaction force changes, or in the case that a target steering angle changes rapidly, a vibration occurs by a natural vibration caused by a mass damper of a steering wheel and a spring of a torsion bar, and a driver may feel it as uncomfortable feeling or unpleasantness.

The apparatus disclosed in Patent Document 3 gradually increases a steering angular velocity at the start of the steering angle control, and since the steering angular velocity continues increasing until an upper limit after beginning to increase, an integral value of the I-control accumulates excessively. As a result, the steering angle control command value becomes an excessive value, a steering wheel reacts to the steering angular velocity command value excessively, and it may cause uncomfortable feeling to a driver.

The present invention has been developed in view of the above-described circumstances, and an object of the present invention is to provide an electric power steering apparatus that achieves manual steering even if steering intervent ion is performed by a driver during automatic steering, ensures more safety when a driver steers urgently, and enables both assist control and steering angle control.

Means for Solving the Problems

The present invention relates to an electric power steering apparatus that drives a motor based on a current command value, and performs assist control and steering angle control to a steering system by driving and controlling the motor, the above-described object of the present invention is achieved by that comprising: a steering angle control section that calculates a steering angle control current command value for the steering angle control based on at least a steering angle command value and an actual steering angle; wherein the steering angle control section comprises a position control section that calculates a basic steering angular velocity command value based on the steering angle command value and the actual steering angle, a steering intervention compensating section that obtains a compensatory steering angular velocity command value for steering intervention compensation depending on a steering torque, and a steering angular velocity control section that calculates the steering angle control current command value based on a steering angular velocity command value calculated by the basic steering angular velocity command value and the compensatory steering angular velocity command value and an actual steering angular velocity; wherein the steering intervention compensating section comprises a compensation gain section that multiplies the steering torque by a steering intervention compensation gain, and the steering intervention compensating section obtains the compensatory steering angular velocity command value by the steering torque through the compensation gain section; and wherein the electric power steering apparatus calculates the current command value using at least the steering angle control current command value.

The above-described object of the present invention is more effectively achieved by that wherein the steering angle control section further comprises a filter section that transforms the steering angular velocity command value into an extended steering angular velocity command value using an FF filter, and wherein the steering angular velocity control section calculates the steering angle control current command value based on the extended steering angular velocity command value and the actual steering angular velocity; or wherein the position control section comprises a proportional gain section that calculates the basic steering angular velocity command value by multiplying a deviation between the steering angle command value and the actual steering angle by a proportional gain; or wherein the position control section comprises a reference model section that transforms the steering angle command value into a target steering angle using a reference model, a proportional gain section that calculates a first steering angular velocity command value by multiplying a deviation between the target steering angle and the actual steering angle by a proportional gain, and a filter section that transforms the steering angle command value into a second steering angular velocity command value using an FF filter, and the position control section calculates the basic steering angular velocity command value by adding the second steering angular velocity command value to the first steering angular velocity command value; or wherein the steering intervention compensation gain decreases as a vehicle speed increases; or wherein the steering intervention compensating section further comprises a steering intervention phase compensating section that performs phase compensation to the steering torque, and the steering intervention compensating section obtains the compensatory steering angular velocity command value by the steering torque through the compensation gain section and the steering intervention phase compensating section; or wherein the steering angular velocity control section calculates the steering angle control current command value by an I-P control; or wherein the electric power steering apparatus further comprises an assist control section that calculates an assist control current command value for the assist control based on at least the steering torque, and the electric power steering apparatus calculates the current command value by the assist control current command value and the steering angle control current command value; or wherein the electric power steering apparatus multiplies the assist control current command value by an assist control output gradual change gain to adjust the assist control current command value; or wherein the electric power steering apparatus multiplies an assist map output current obtained in the assist control section by an assist map gradual change gain; or wherein the electric power steering apparatus performs only the steering angle control to the steering system by multiplying the assist control current command value by the assist control output gradual change gain whose value is zero; or wherein the steering angle control section further comprises a steering angle control current command value limiting section that limits the steering angle control current command value by a preset limit value.

Effects of the Invention

The electric power steering apparatus of the present invention enables safety and reduction of uncomfortable feeling even if steering intervention is performed during automatic steering because it compensates the steering intervention by using the gain.

BRIEF DESCRIPTION OF THE DRAWINGS

In the accompanying drawings:

FIGS. 35A and 35B are characteristic diagrams showing an example of frequency characteristics of respective transfer functions in the simulation with respect to the reference model and the FF filter;

FIG. 36 is a graph showing a result of the simulation with respect to the reference model and the FF filter;

MODE FOR CARRYING OUT THE INVENTION

An electric power steering apparatus (EPS) according to the present invention performs assist control being a function of a conventional EPS and steering angle control necessary to automatic steering in automatic driving. The assist control and the steering angle control are performed at an assist control section and a steering angle control section respectively, and the EPS calculates a current command value for driving and controlling a motor by using an assist control current command value and a steering angle control current command value outputted from respective sections. Both of the steering angle control and the assist control are performed in automatic steering (an automatic steering state), and the assist control is performed in manual steering (a manual steering state) when a driver takes part in steering. In order to reduce uncomfortable feeling caused by steering intervention during automatic steering, the EPS performs steering intervention compensation corresponding to a steering torque. Specifically, the EPS compensates a steering angular velocity command value by means of a compensation value (a compensatory steering angular velocity command value) obtained at a steering intervention compensating section by a prepared steering intervention compensation gain. It is possible to change the steering intervention compensation gain depending on a vehicle speed.

Hereinafter, an embodiment of the present invention will be described with reference to the accompanying drawings.

First, a whole vehicle system including the electric power steering apparatus according to the present invention will be described.

Figure 3:
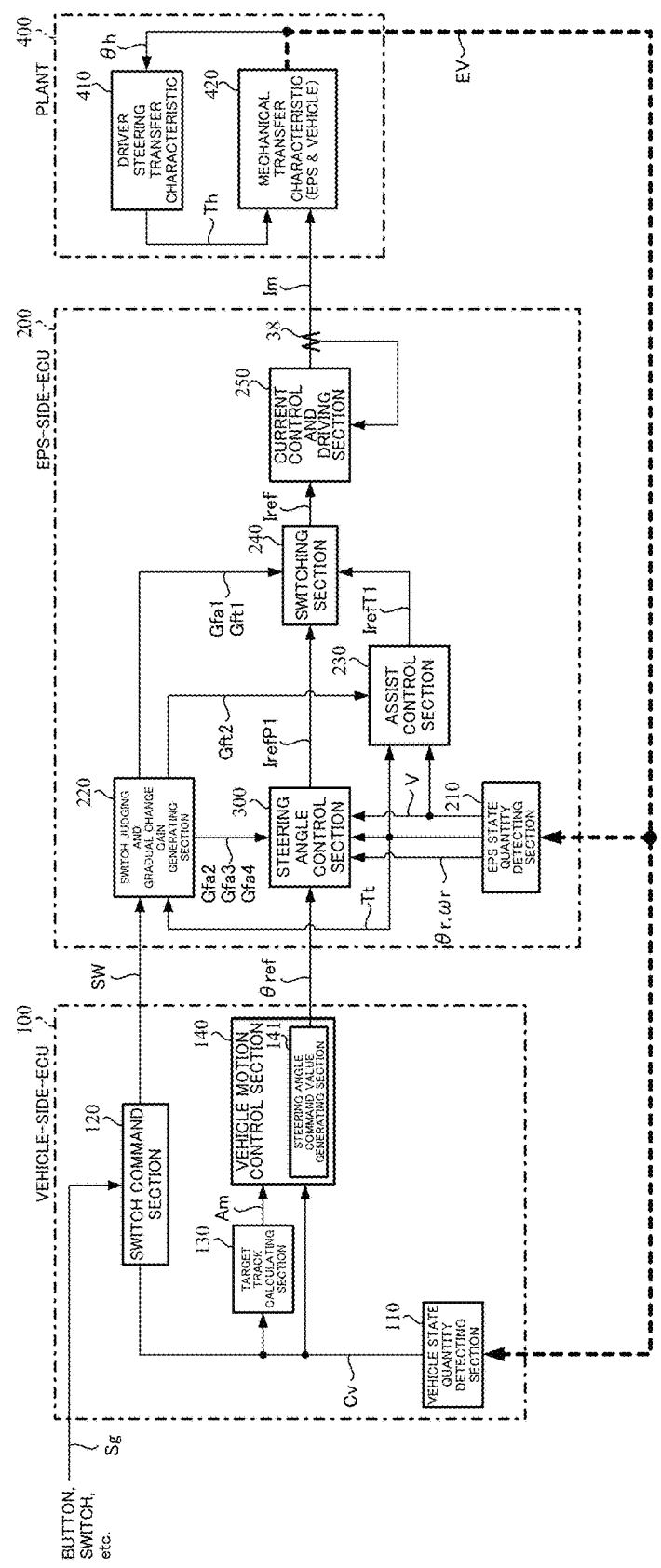
FIG. 3 is a block diagram showing a configuration example of a whole vehicle system relating to the present invention.

FIG. 3 shows a configuration example (a first embodiment) of the whole vehicle system relating to the present invention, which comprises an ECU equipped for a vehicle (hereinafter referred to a "vehicle-side-ECU") 100, an ECU equipped for the EPS (hereinafter referred to an "EPS-side-ECU") 200, and a plant 400.

The vehicle-side-ECU 100 comprises a vehicle state quantity detecting section 110, a switch command section 120, a target track calculating section 130 and a vehicle motion control section 140.

The vehicle state quantity detecting section 110 comprises anon-vehicle camera, a distance sensor, an angular velocity sensor, an acceleration sensor and so on, and outputs data detected by them as a vehicle state quantity Cv to the switch command section 120, the target track calculating section 130 and the vehicle motion control section 140.

The switch command section 120 inputs a signal Sg for switching an operation mode from a button, a switch or the like provided for a dashboard or the like with the vehicle state quantity Cv, and outputs a switch signal SW to the EPS-side-ECU 200. The operation mode has an "assist control mode" and a "steering angle control mode", the "assist control mode" is a mode corresponding to manual steering, and the "steering angle control mode" is a mode corresponding to automatic steering. The switch command section 120 determines the operation mode considering respective data included in the vehicle state quantity Cv on the basis of the signal Sg which shows an intention of a driver, and outputs the determined operation mode as the switch signal SW.

The target track calculating section 130 calculates a target track Am by an existing method on the basis of the vehicle state quantity Cv, and outputs it to the vehicle motion control section 140.

The vehicle motion control section 140 comprises a steering angle command value generating section 141. The steering angle command value generating section 141 generates a steering angle command value θref being a control target value of a steering angle on the basis of the target track Am and the vehicle state quantity Cv, and outputs it to the EPS-side-ECU 200.

The EPS-side-ECU 200 comprises an EPS state quantity detecting section 210, a switch judging and gradual change gain generating section 220, a steering angle control section 300, an assist control section 230, a switching section 240, a current control and driving section 250 and a motor current detector 38.

The EPS state quantity detecting section 210 comprises an angle sensor, a torque sensor and a speed sensor, and detects an EPS state quantity. Specifically, the angle sensor detects a steering wheel angle (an angle at an upper side of a torsion bar) θh as an actual steering angle θr, the torque sensor detects a steering torque Tt, and the speed sensor detects a vehicle speed V. The EPS state quantity detecting section 210 calculates an actual steering angular velocity ωr by performing differential calculation to the actual steering angle θr. The actual steering angle θr and the actual steering angular velocity ωr are inputted into the steering angle control section 300, the steering torque Tt is inputted into the switch judging and gradual change gain generating section 220, the steering angle control section 300 and the assist control section 230, and the vehicle speed V is inputted into the steering angle control section 300 and the assist control section 230. Moreover, it is possible to use a column angle (an angle at a lower side of a torsion bar) as the actual steering angle θr, and also to use a rotational angle of a motor as the actual steering angle θr by comprising a motor angle sensor (a rotational angle sensor). Furthermore, the actual steering angle θr and the vehicle speed V may be detected at the vehicle-side-ECU 100, and may be sent to the EPS-side-ECU 200. The actual steering angular velocity ωr may be calculated by performing difference calculation with respect to the rotational angle detected by the motor angle sensor and using a gear ratio, or may be calculated by performing difference calculation with respect to the actual steering angle θr. It is possible to insert a low pass filter (LPF) at the final stage of the EPS state quantity detecting section 210 to reduce a high frequency noise, and in this case, it is possible to calculate the actual steering angular velocity ωr by a high pass filter (HPF) and a gain.

The switch judging and gradual change gain generating section 220 performs switch judging between the automatic steering and the manual steering on the basis of the switch signal SW from the vehicle-side-ECU 100 and the steering torque Tt, and determines gradual change gains on the basis of the judgment result. The switch judging and gradual change gain generating section 220 obtains a steering angle control output gradual change gain Gfa1, a velocity control gradual change gain Gfa2, a velocity command gradual change gain Gfa3, a steering angle command gradual change gain Gfa4, an assist control output gradual change gain Gft1 and an assist map gradual change gain Gft2, the Gfa1 and the Gft1 are inputted into the switching section 240, the Gfa2, the Gfa3 and the Gfa4 is inputted into the steering angle control section 300, and the Gft2 is inputted into the assist control section 230. The detail of the switch judging and gradual change gain generating section 220 will be described later.

The steering angle control section 300 calculates a steering angle control current command value IrefP1 by using the steering angle command value θref from the vehicle-side-ECU 100, the actual steering angle θr, the actual steering angular velocity ωr, the steering torque Tt, the vehicle speed V and the gradual change gains Gfa2, Gfa3 and Gfa4 in order to perform the steering angle control. The steering angle control current command value IrefP1 is inputted into the switching section 240. Moreover, it is possible to calculate the actual steering angular velocity ωr not at the EPS state quantity detecting section 210 but at steering angle control section 300. The detail of the steering angle control section 300 will be described later.

Figure 1:
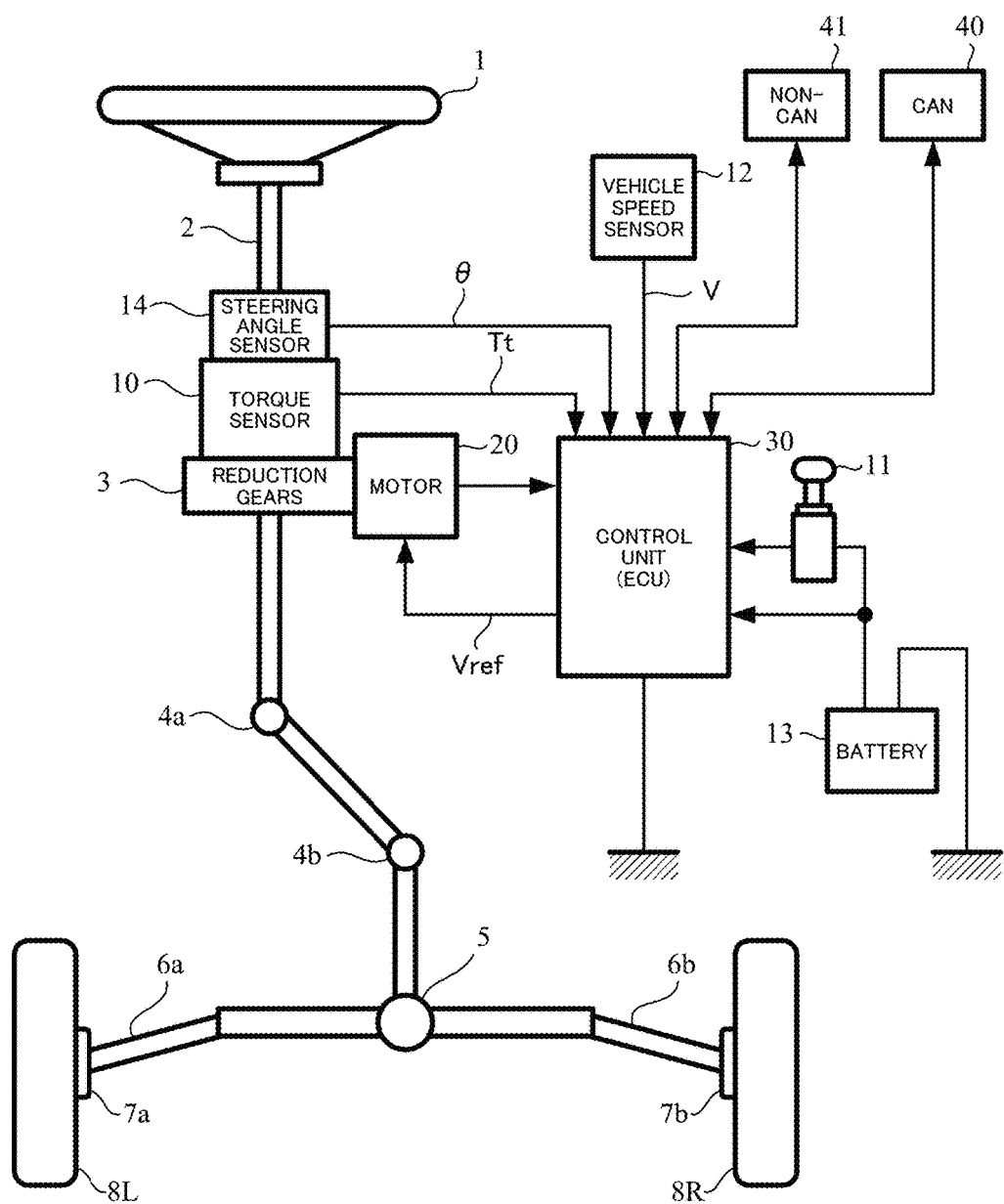
FIG. 1 is a configuration diagram illustrating a general outline of an electric power steering apparatus.
Figure 2:
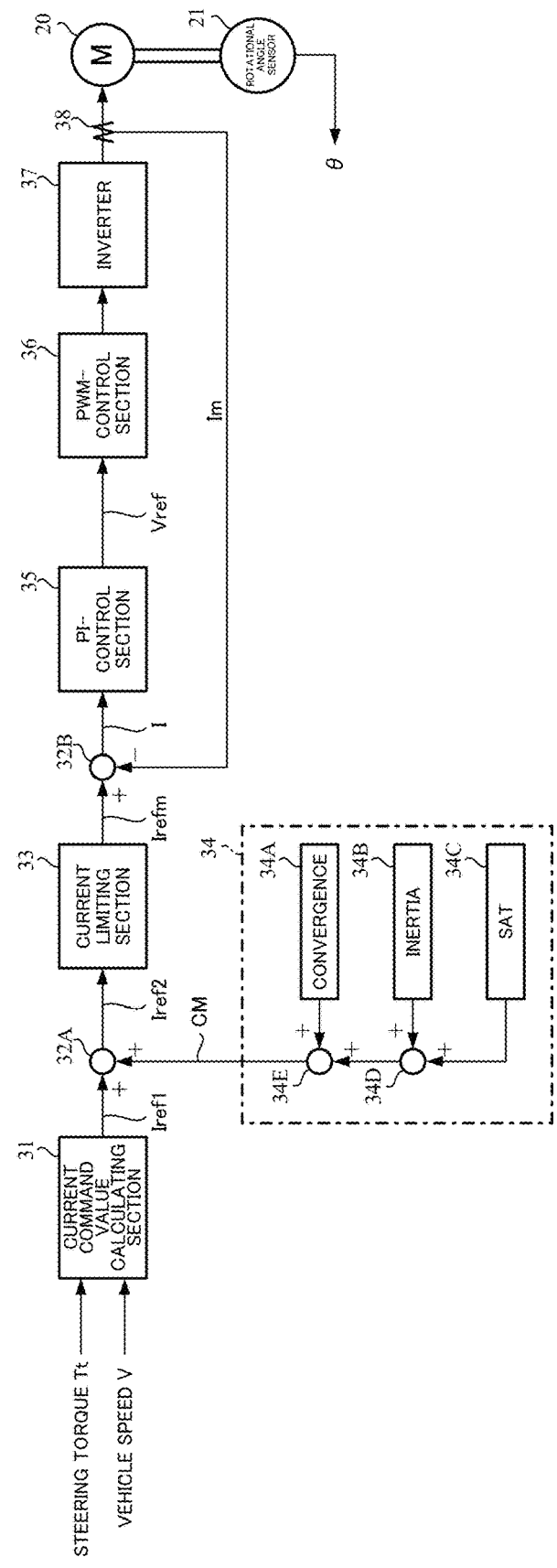
FIG. 2 is a block diagram showing a configuration example of a control unit (ECU) of the electric power steering apparatus.

The assist control section 230 comprises, for example, a current command value calculating section 31, a current limiting section 33, a compensation signal generating section 34 and an adding section 32A in a configuration example shown in FIG. 2 in order to perform the assist control, and calculates an assist control current command value IrefT1 equivalent to a current command value Irefm shown in FIG. 2 on the basis of the steering torque Tt and the vehicle speed V and by using an assist map. However, the assist control section 230 is different from the configuration example shown in FIG. 2, inputs the assist map gradual change gain Gft2 outputted from the switch judging and gradual change gain generating section 220, multiplies an output (an assist map output current) from the current command value calculating section 31 by the Gft2, and inputs the multiplication result into the adding section 32A. The assist map used at the current command value calculating section 31 is a map that defines a characteristic of a current command value to the steering torque Tt, is vehicle speed sensitive, and has a characteristic that the current command value decreases as the vehicle speed V increases. Moreover, the current limiting section 33 and/or the compensation signal generating section 34 may be removed.

The switching section 240 calculates a current command value Iref by using the steering angle control current command value IrefP1, the assist control current command value IrefT1 and the gradual change gains Gfa1 and Gft1. The detail of the switching section 240 will be described later.

The current control and driving section 250 comprises, for example, a subtracting section 32B, a PI-control section 35, a PWM-control section 36 and an inverter 37 in the configuration example shown in FIG. 2, and drives and controls the motor by using the current command value Iref and a motor current Im detected by the motor current detector 38 and by the same operations as the configuration example shown in FIG. 2.

The plant 400 is a physical model of a control target that simulates a characteristic of a driver in steering of a steering wheel and a mechanical characteristic of an EPS and a vehicle, and comprises a driver steering transfer characteristic 410 and a mechanical transfer characteristic 420. A mechanical system operates on the basis of a steering wheel manual input torque Th caused by the steering of the driver and the motor current Im from the EPS-side-ECU 200, and this causes a state information EV with respect to the vehicle and the EPS, so that the mechanical transfer characteristic 420 outputs the state information EV. The vehicle state quantity detecting section 110 in the vehicle-side-ECU 100 and the EPS state quantity detecting section 210 in the EPS-side-ECU 200 detect the vehicle state quantity Cv and the EPS state quantity respectively from the state information EV. Since the steering wheel manual input torque Th caused by steering of the driver occurs depending on the steering wheel angle θh included in the state information EV, the driver steering transfer characteristic 410 outputs the steering wheel manual input torque Th.

Next, the switch judging and gradual change gain generating section 220, the steering angle control section 300 and the switching section 240 in the EPS-side-ECU 200 will be described in detail.

Figure 4:
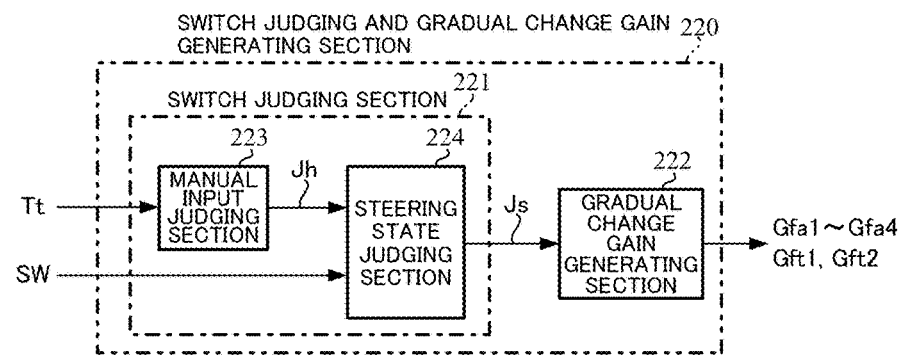
FIG. 4 is a block diagram showing a configuration example of a switch judging and gradual change gain generating section.

FIG. 4 shows a configuration example of the switch judging and gradual change gain generating section 220, the switch judging and gradual change gain generating section 220 comprises a switch judging section 221 and a gradual change gain generating section 222, and the switch judging section 221 comprises a manual input judging section 223 and a steering state judging section 224.

Figure 5:
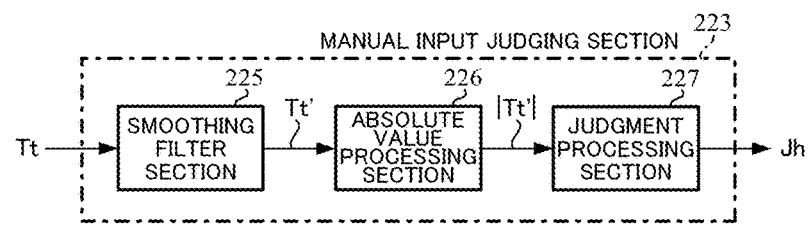
FIG. 5 is a block diagram showing a configuration example of a manual input judging section.

The manual input judging section 223 judges whether a manual input is performed or not by using the steering torque Tt. A configuration example of the manual input judging section 223 is shown in FIG. 5. The manual input judging section 223 comprises a smoothing filter section 225, an absolute value processing section 226 and a judgment processing section 227. The smoothing filter section 225 has a smoothing filter, smoothes the steering torque Tt by the smoothing filter, and outputs a steering torque Tt' obtained after the smoothing. The steering torque Tt' is inputted into the absolute value processing section 226, and the absolute value processing section 226 outputs an absolute value (an absolute value data) |Tt'| of the steering torque Tt'. The absolute value |Tt'| is inputted into the judgment processing section 227. The judgment processing section 227 compares a predetermined threshold Tth and the absolute value |Tt'|, judges that "the manual input is performed" when the absolute value |Tt'| is larger than or equal to the threshold Tth, judges that "the manual input is not performed" when the absolute value |Tt'| is smaller than the threshold Tth, and outputs the judgment result as a manual input judgment signal Jh.

The steering state judging section 224 judges a steering state by the switch signal SW from the vehicle-side-ECU 100 and the manual input judgment signal Jh. When the switch signal SW indicates the "assist control mode" or the manual input judgment signal Jh indicates that "the manual input is performed", the steering state judging section 224 judges that the steering state is the "manual steering". Otherwise, that is, when the switch signal SW indicates the "steering angle control mode" and the manual input judgment signal Jh indicates that "the manual input is not performed", the steering state judging section 224 judges that the steering state is the "automatic steering". The judgment result is outputted as a steering state judgment signal Js. Moreover, it is possible to judge the steering state by the manual input judgment signal Jh alone. That is, the steering state judging section 224 may judge that the steering state is the "manual steering" when the manual input judgment signal Jh indicates that "the manual input is performed", and may judge that the steering state is the "automatic steering" when the manual input judgment signal Jh indicates that "the manual input is not performed".

The gradual change gain generating section 222 determines the gradual change gains on the basis of the steering state judgment signal Js. The gradual change gains take various values depending on the steering state, and the gradual change gain generating section 222 judges the steering state by the steering state judgment signal Js.

Figure 6A:
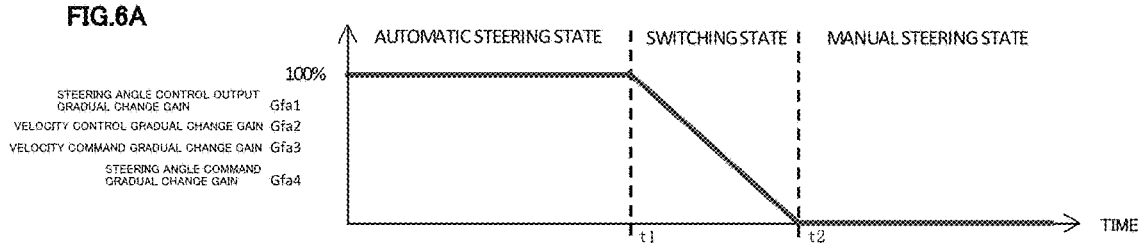
FIGS. 6A, 6B and 6C are graphs showing an example of changing gradual change gains corresponding to a steering state.

The gradual change gains Gfa1, Gfa2, Gfa3 and Gfa4 are 100% in the automatic steering state, are 0% in the manual steering state, and are gradually changed in the case of transferring from the automatic steering state to the manual steering and in the case of transferring from the manual steering to the automatic steering state. For example, in the case of transferring from the automatic steering state to the manual steering, the gradual change gains Gfa1 to Gfa4 are changed as shown in FIG. 6A. That is, the gradual gains successively decrease from the time point t1 when the steering state judgment signal Js is changed from the "automatic steering" to the "manual steering", and become 0% at the time point t2. On the contrary, in the case of transferring from the manual steering to the automatic steering state, the gradual change gains successively increase from the time point when the steering state judgment signal Js is changed to the "automatic steering". In the case that the steering state judgment signal Js is changed during the decrease or the increase in the gradual change gains (hereinafter this state of the decrease or the increase is referred to a "switching state"), the gradual change gains turn to increase if decreasing, and turn to decrease if increasing. Moreover, the gradual change gains are changed linearly in the switching state in FIG. 6A, however, in order to make the switching operation smooth, they may be changed like an S-shaped bend, and it is possible to use the gradual change gains changed linearly through such an LPF as a primary LPF whose cutoff frequency is 2 Hz. Further, the gradual change gains Gfa1 to Gfa4 do not need to similarly change in conjunction, and may change independently.

Figure 6B:
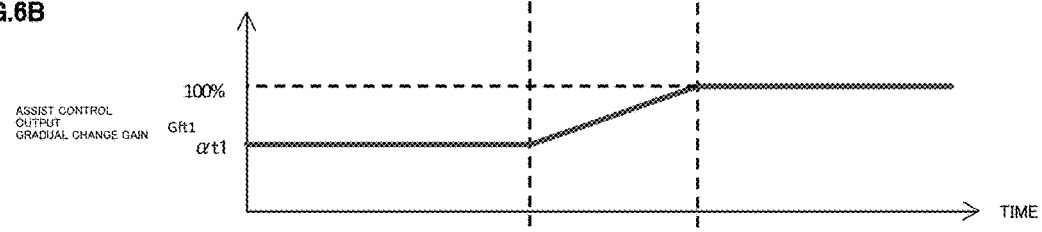

The assist control output gradual change gain Gft1 is αt1 [%] (0≤αt1≤150) in the automatic steering state, is 100% in the manual steering state, and is gradually changed in the switching state as with the gradual change gains Gfa1 to Gfa4, as shown in FIG. 6B.

Figure 6C:
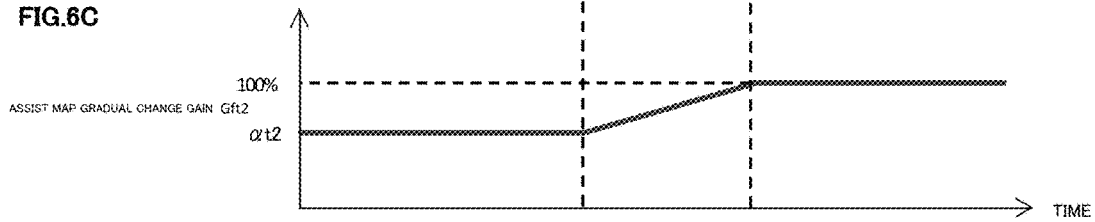

The assist map gradual change gain Gft2 is αt2 [%] (0≤αt2≤150) in the automatic steering state, is 100% in the manual steering state, and is gradually changed in the switching state as with the gradual change gains Gfa1 to Gfa4, as shown in FIG. 6C.

Figure 7:
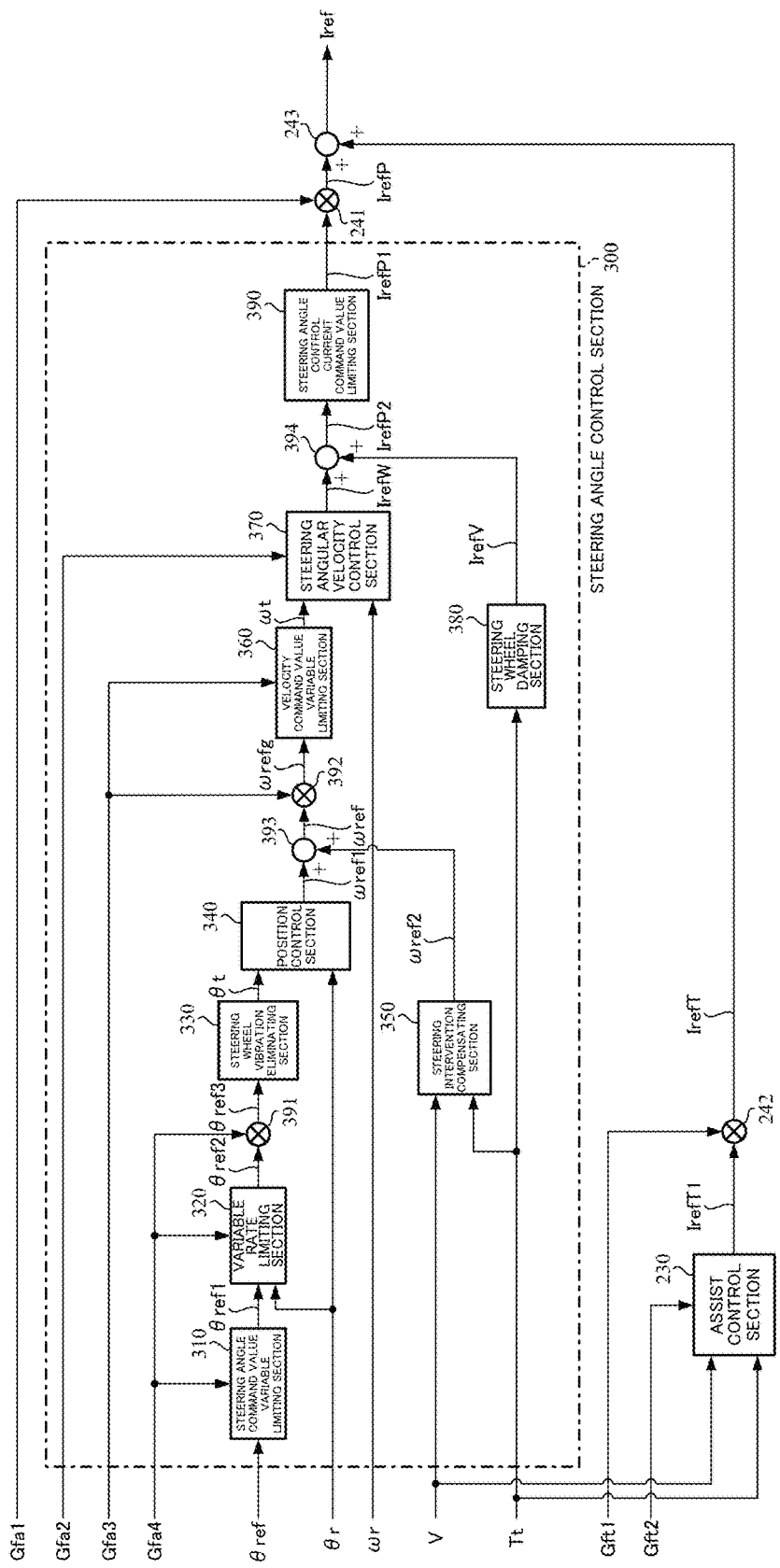
FIG. 7 is a block diagram showing a configuration example (a first embodiment) of a steering angle control section and a switching section.

A configuration example of the steering angle control section 300 and the switching section 240 is shown in FIG. 7. The steering angle control section 300 comprises a steering angle command value variable limiting section 310, a variable rate limiting section 320, a steering wheel vibration eliminating section 330, a position control section 340, a steering intervention compensating section 350, a velocity command value variable limiting section 360, a steering angular velocity control section 370, a steering wheel damping section 380, a steering angle control current command value limiting section 390, multiplying sections 391 and 392, and adding sections 393 and 394, and the switching section 240 comprises multiplying sections 241 and 242, and an adding section 243.

Figure 8:
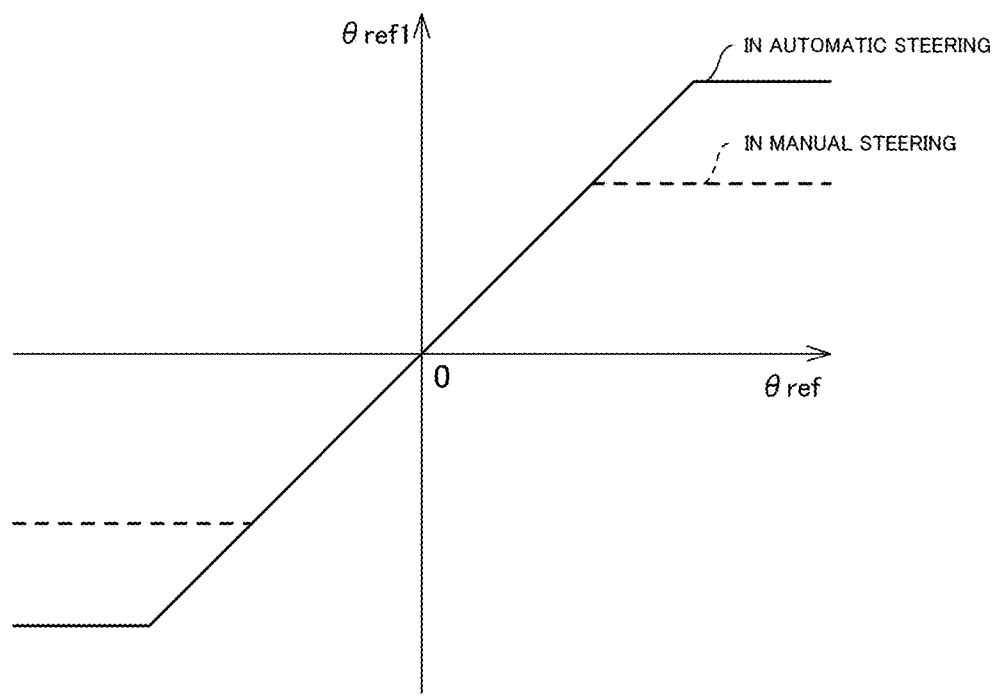
FIG. 8 is a characteristic diagram showing an example of a limit value in a steering angle command value variable limiting section.

The steering angle command value variable limiting section 310 of the steering angle control section 300 limits the steering angle command value θref which is received from the vehicle-side-ECU 100 and is used for the automatic steering or the like by setting limit values (an upper limit value and a lower limit value) in order to prevent an abnormal value and an excessive value caused by a communication error or the like from being inputted into the steering control, and outputs the limited value as a steering angle command value θref1. The steering angle command value variable limiting section 310 sets the limit values depending on the steering angle command gradual change gain Gfa4 so as to set appropriate limit values in the automatic steering state and the manual steering state. For example, as shown in FIG. 8, the steering angle command value variable limiting section 310 judges the case where the steering angle command gradual change gain Gfa4 is 100% to be the automatic steering state, and limits the steering angle command value θref with the limit value shown by the solid line. The steering angle command value variable limiting section 310 judges the case where the steering angle command gradual change gain Gfa4 is 0% to be the manual steering state, and limits the steering angle command value θref with the limit value whose absolute value is smaller than in the automatic steering state as shown by the broken line. The steering angle command value variable limiting section 310 judges the case where the steering angle command gradual change gain Gfa4 is between 0% and 100% to be the switching state, and limits the steering angle command value θref with a value between the solid line and the broken line. In the switching state, it is possible to limit the steering angle command value θref with the limit value of the automatic steering state shown by the solid line or the limit value of the manual steering state shown by the broken line. Moreover, a magnitude (an absolute value) of the upper limit value and a magnitude of the lower limit value may be different.

In order to avoid sharply changing a steering angle control current command value being an output of the steering angle control by a sudden change of the steering angle command value θref, the variable rate limiting section 320 limits a change amount of the steering angle command value θref1 by setting a limit value, and outputs a steering angle command value θref2. For example, a difference between the previous and the present steering angle command values θref1 is defined as the change amount. In the case that the absolute value of the change amount is larger than a predetermined value (a limit value), the variable rate limiting section 320 performs addition or subtraction to the steering angle command value θref1 so that the absolute value of the change amount becomes the limit value, and outputs the result as the steering angle command value θref2. In the case that the absolute value of the change amount is smaller than or equal to the limit value, the variable rate limiting section 320 outputs the steering angle command value θref1 as the steering angle command value θref2 without changing it. As with the steering angle command value variable limiting section 310, the variable rate limiting section 320 sets the limit value depending on the steering angle command gradual change gain Gfa4 so as to set an appropriate limit value in the automatic steering state and the manual steering state. The variable rate limiting section 320 judges the steering state by the steering angle command gradual change gain Gfa4. The variable rate limiting section 320 sets the limit value to a predetermined limit value in the automatic steering state, and sets the limit value to zero in the manual steering state so that the steering angle command value θref2 is not changed and becomes constant. Though the variable rate limiting section 320 uses an intermediate value between both limit values in the switching state, it may use the limit value of the automatic steering state or the limit value of the manual steering state. Moreover, it is possible to limit the change amount by setting an upper limit value and a lower limit value instead of setting the limit value for the absolute value of the change amount.

At the multiplying section 391, the steering angle command value θref2 is multiplied by the steering angle command gradual change gain Gfa4, and the multiplication result is outputted as a steering angle command value θref3. This makes a target steering angle θt which is outputted from the steering wheel vibration eliminating section 330 as described below in the switching state from the automatic steering state to the manual steering state, gradually approximate zero, and can make the steering angle control operate to a neutral state.

The steering wheel vibration eliminating section 330 reduces a vibration frequency component included in the steering angle command value θref3. In the automatic steering, when the steering command is changed, a frequency component (before and after about 10 Hz) exciting a vibration caused by springiness of a torsion bar and an inertia moment of a steering wheel, occurs in the steering angle command value θref3. The steering wheel vibration eliminating section 330 reduces the steering wheel vibration frequency component included this steering angle command value θref3 by a filter processing using an LPF, a notch filter and so on or phase delay compensation, and outputs the target steering angle θt. As a filter, any filter may be used if it lowers a gain in a band of the steering wheel vibration frequency and is possible to provide for the ECU. Providing the multiplying section 391 multiplying the steering angle command gradual change gain Gfa4 in front of the steering wheel vibration eliminating section 330, enables reduction of the steering wheel vibration frequency component caused by multiplying the steering angle command gradual change gain Gfa4. Moreover, it is possible to omit the steering wheel vibration eliminating section 330 in such a case that the steering wheel vibration frequency component is minute.

The position control section 340 calculates a steering angular velocity command value (a basic steering angular velocity command value) ωref1 for making the actual steering angle θr approximate the target steering angle θt on the basis of a deviation between the target steering angle θt and the actual steering angle θr by a proportional (P) control.

Figure 9:
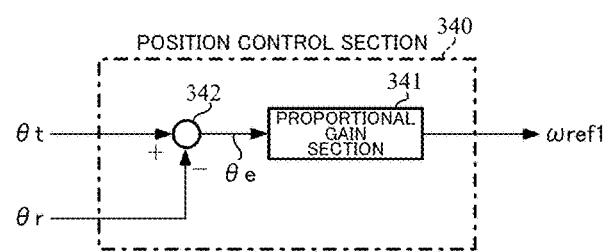
FIG. 9 is a block diagram showing a configuration example (the first embodiment) of a position control section.

A configuration example of the position control section 340 is shown in FIG. 9. The position control section 340 comprises a proportional gain section 341 and a subtracting section 342. A deviation θe (=θt−θr) between the target steering angle θt and the actual steering angle θr is obtained at the subtracting section 342, and the deviation θe is inputted into the proportional gain section 341. The proportional gain section 341 multiplies the deviation θe by a proportional gain Kpp, and calculates the steering angular velocity command value ωref1.

The steering intervention compensating section 350 calculates a steering angular velocity command value (a compensatory steering angular velocity command value) ωref2 for compensating steering intervention corresponding to the steering torque Tt. A value obtained by adding the steering angular velocity command value ωref2 and the steering angular velocity command value ωref1 from the position control section 340 becomes a steering angular velocity command value ωref. The function of the steering intervention compensating section 350 enables generation of the steering angular velocity command value to mitigate occurrence of the steering torque, and can achieve the steering intervention during the automatic steering.

Figure 10:
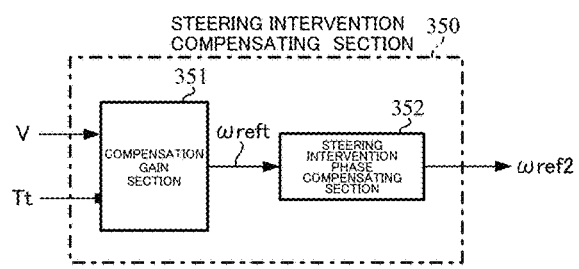
FIG. 10 is a block diagram showing a configuration example of a steering intervention compensating section.

A configuration example of the steering intervention compensating section 350 is shown in FIG. 10. The steering intervention compensating section 350 comprises a compensation gain section 351 and a steering intervention phase compensating section 352.

Figure 11:
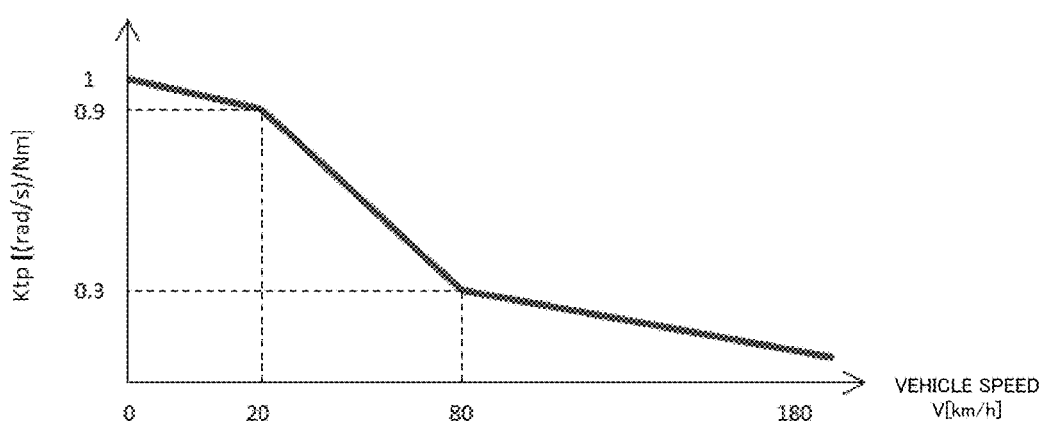
FIG. 11 is a characteristic diagram showing an example of changing a steering intervention compensation gain with respect to a vehicle speed.

The compensation gain section 351 multiplies the steering torque Tt by a steering intervention compensation gain Ktp, and calculates a steering angular velocity command value ωreft. The steering intervention compensation gain Ktp is a vehicle speed sensitive gain that is changed depending on the vehicle speed V, and is adjusted by turning. For example, as shown in FIG. 11, the steering intervention compensation gain Ktp decreases as the vehicle speed V increases. This enables heavy feeling at a higher vehicle speed. The assist map used at the assist control section 230 is also a vehicle speed sensitive map where the assist control current command value decreases as the vehicle speed V increases, so that when the steering intervention is performed by a driver at high speed traveling, increases in the steering angular velocity command value and the assist control current command value are suppressed, the steering does not become sudden, and safe steering is enabled. Moreover, though the steering intervention compensation gain Ktp is changed like a polygonal line, it may be changed curvilinearly.

The steering intervention phase compensating section 352 sets phase advance compensation as phase compensation, and transforms the steering angular velocity command value ωreft into the steering angular velocity command value ωref2. The steering intervention phase compensating section 352 performs the phase advance compensation, for example, by a primary filter where a cutoff frequency of a numerator is 1.0 Hz and a cutoff frequency of a denominator is 1.3 Hz. This enables improvement of feeling without resistance and catching feeling in such a case of suddenly steering. Moreover, the steering intervention phase compensating section 352 may be omitted in such a case of focusing on a cost. Further, it is possible to provide the steering intervention phase compensating section 352 at the front stage of the input of the steering torque Tt into the compensation gain section 351. In this case, the steering torque Tt is inputted into the steering intervention phase compensating section 352, and the steering torque obtained by performing the phase compensation is inputted into the compensation gain section 351.

The steering angular velocity command value ωref1 outputted from the position control section 340 and the steering angular velocity command value ωref2 outputted from the steering intervention compensating section 350 are added at the adding section 393, and the addition result is outputted as the steering angular velocity command value ωref.

The steering angular velocity command value ωref is multiplied by the velocity command gradual change gain Gfa3 at the multiplying section 392, and the multiplication result is outputted as a steering angular velocity command value ωrefg. The velocity command gradual change gain Gfa3 is used in order to achieve smooth switching in the case of switching from the manual steering state to the automatic steering state. Moreover, the velocity command gradual change gain Gfa3 is changed synchronizing with the steering angle control output gradual change gain Gfa1 by which the steering angle control current command value IrefP1 is multiplied (the synchronization may not be perfect).

Figure 12:
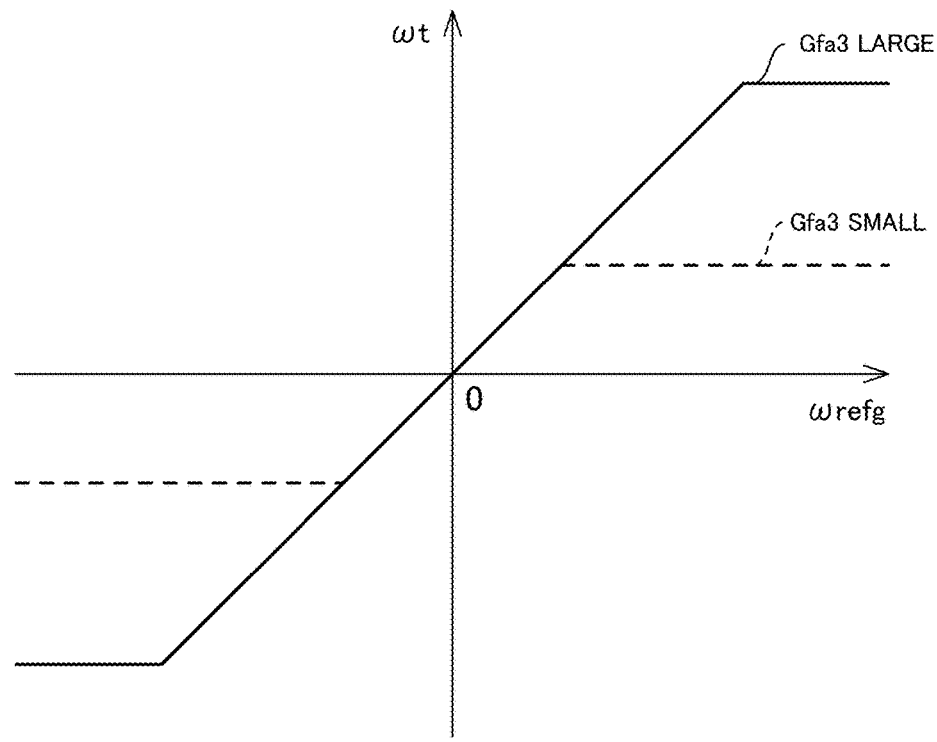
FIG. 12 is a characteristic diagram showing an example of a limit value in a velocity command value variable limiting section.

The velocity command value variable limiting section 360 limits the steering angular velocity command value ωrefg by setting limit values (an upper limit value and a lower limit value), and outputs a target steering angular velocity ωt. The limit values are set depending on the velocity command gradual change gain Gfa3. For example, when the velocity command gradual change gain Gfa3 is smaller than a predetermined threshold, magnitudes (absolute values) of the limit values are small values as shown by the broken line in FIG. 12, and when it is larger than or equal to the predetermined threshold, the magnitudes of the limit values are increased to the values shown by the solid line. Moreover, it is possible that the predetermined threshold is set to any value of the velocity command gradual change gain Gfa3 in the switching state, the magnitudes of the limit values are fixed at the small values shown by the broken line when the Gfa3 is smaller than the predetermined threshold, and the magnitudes of the limit values are gradually increased to the values shown by the solid line. The magnitude of the upper limit value and the magnitude of the lower limit value may be different.

The steering angular velocity control section 370 inputs the target steering angular velocity wt, the actual steering angular velocity ωr and the velocity control gradual change gain Gfa2, and calculates a steering angle control current command value IrefW by a proportional preceding type PI (I-P) control so that the actual steering angular velocity ωr follows the target steering angular velocity ωt.

Figure 13:
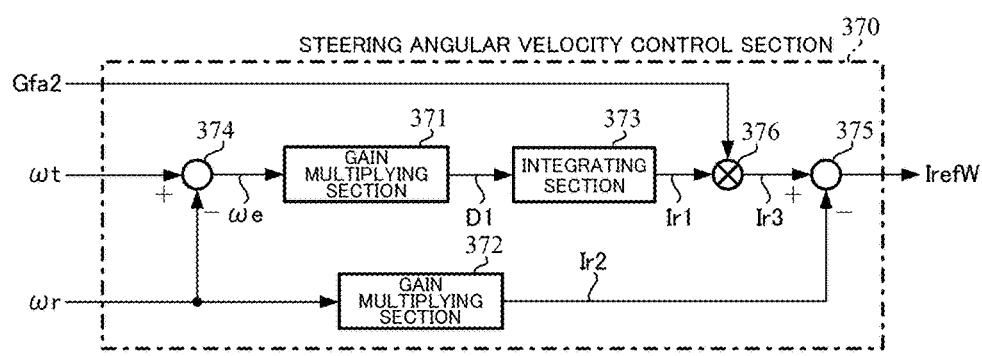
FIG. 13 is a block diagram showing a configuration example (the first embodiment) of a steering angular velocity control section.

A configuration example of the steering angular velocity control section 370 is shown in FIG. 13. The steering angular velocity control section 370 comprises gain multiplying sections 371 and 372, an integrating section 373, subtracting sections 374 and 375, and a multiplying section 376.

The gain multiplying section 371 multiplies a deviation ωe (=ωt−ωr) between the target steering angular velocity ωt and the actual steering angular velocity ωr, which is calculated at the subtracting section 374, by a gain Kvi, and outputs an operation amount D1. The integrating section 373 integrates the operation amount D1, and calculates a control amount Ir1. At the multiplying section 376, the control amount Ir1 is multiplied by the velocity control gradual change gain Gfa2, and the multiplication result is outputted as a control amount Ir3. The multiplication of the velocity control gradual change gain Gfa2 is performed in order to achieve smooth switching between the manual steering state and the automatic steering state, and this can relax an influence of accumulating an integral value in steering angular velocity control at the time of the switching. The gain multiplying section 372 multiplies the actual steering angular velocity ωr by a gain Kvp, and outputs a control amount Ir2. At the subtracting section 375, a deviation (Ir3−Ir2) between the control amounts Ir3 and Ir2 is calculated, and the subtraction result is outputted as the steering angle control current command value IrefW. Moreover, as the integral of the integrating section 373, any method can be used if it is an integral method possible to achieve in the implementation, and the integrating section 373 can be constituted of a primary delay transfer function and a gain in the case of using pseudo-integral. Further, the velocity control gradual change gain Gfa2 may be changed synchronizing with the steering angle control output gradual change gain Gfa1.

Moreover, the steering angular velocity control section 370 uses the I-P control, however, a control method generally used may be used if it can make the actual steering angular velocity follow the target steering angular velocity. For example, it is possible to use a PI-control, a two-degree of freedom PI-control, a model reference control, a model matching control, a robust control, a control method that estimates a disturbance and combines a compensating means for counteracting a disturbance component with a part of it, and so on.

The steering wheel damping section 380 damps a steering wheel vibration on the basis of the steering torque Tt being a torsion bar torque signal. Though the steering wheel vibration eliminating section 330 also has an effect on the steering wheel vibration in the automatic steering, the steering wheel damping section 380 can further improve the effect. The steering wheel damping section 380 damps the steering wheel vibration by a gain and phase compensation, and outputs a steering angle control current command value IrefV operating to eliminate a twist of a torsion bar. Further, the steering wheel damping section 380 operates to reduce a twist angle, and has also an effect of reducing catching uncomfortable feeling occurring when manual input of a driver intervenes.

Figure 14:
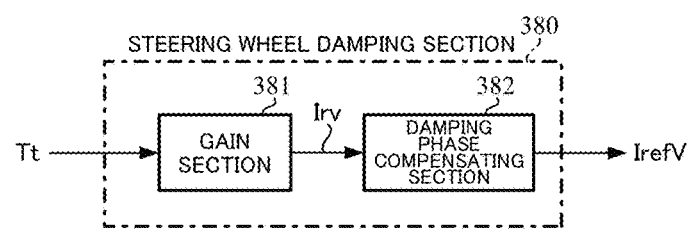
FIG. 14 is a block diagram showing a configuration example of a steering wheel damping section.

A configuration example of the steering wheel damping section 380 is shown in FIG. 14. The steering wheel damping section 380 comprises a gain section 381 and a damping phase compensating section 382. The gain section 381 multiplies the steering torque Tt by a gain Kv, and outputs a control amount Irv. The damping phase compensating section 382 is constituted of, for example, a primary filter, and transforms the control amount Irv into the steering angle control current command value IrefV. The damping phase compensating section 382 may be constituted of a phase compensation filter whose order is larger than or equal to two instead of the primary filter.

At the adding section 394, the steering angle control current command value IrefW outputted from the steering angular velocity control section 370 and the steering angle control current command value IrefV outputted from the steering wheel damping section 380, are added, and the addition result is outputted as a steering angle control current command value IrefP2.

Figure 15:
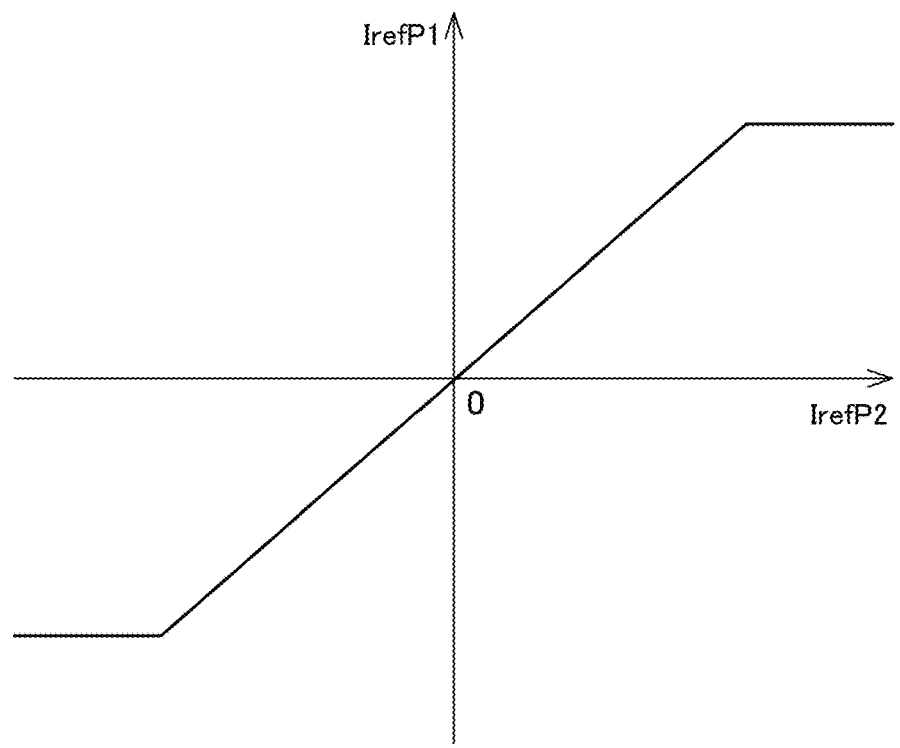
FIG. 15 is characteristic diagram showing an example of a limit value in a steering angle control current command value limiting section.
Figure 16:
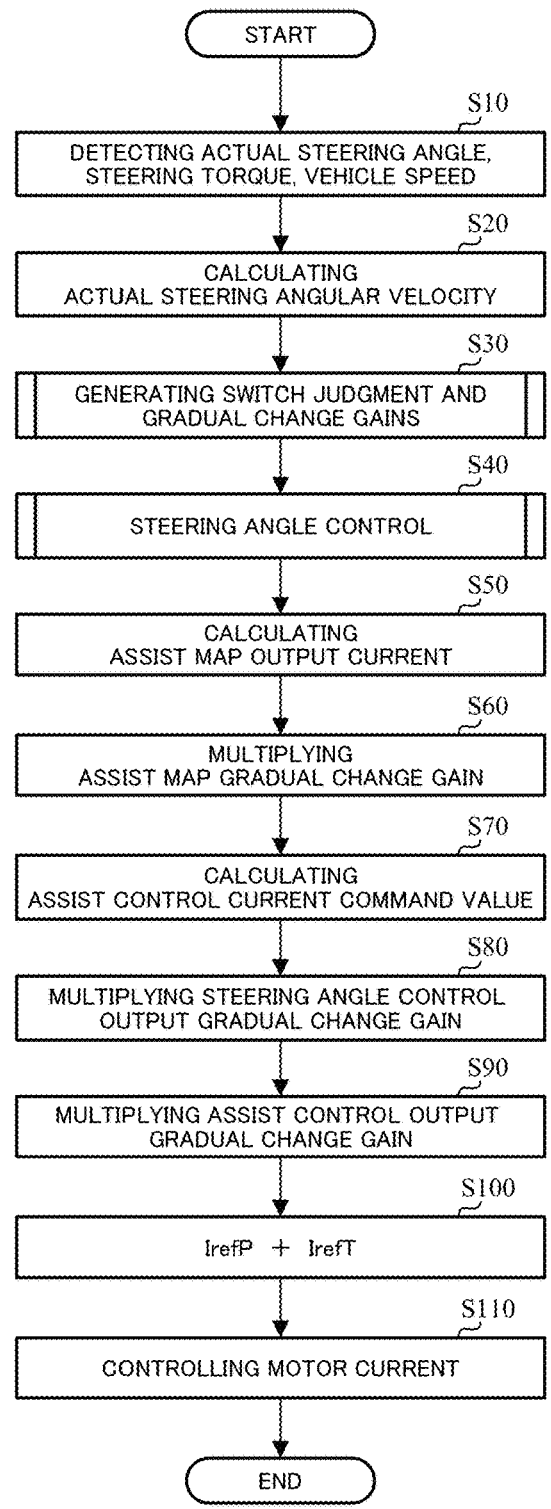
FIG. 16 is a flowchart showing an operating example of an EPS-side-ECU.

The steering angle control current command value limiting section 390 limits the steering angle control current command value IrefP2 by setting limit values (an upper limit value and a lower limit value) in order to prevent an excessive output, and outputs the steering angle control current command value IrefP1. For example, the steering angle control current command value limiting section 390 limits the steering angle control current command value IrefP2 by setting the upper limit value and the lower limit value as shown in FIG. 15. Moreover, a magnitude (an absolute value) of the upper limit value and a magnitude of the lower limit value may be different.

The switching section 240 comprises the multiplying sections 241 and 242, and the adding section 243.

At the multiplying section 241 of the switching section 240, the steering angle control current command value IrefP1 outputted from the steering angle control section 300 is multiplied by the steering angle control output gradual change gain Gfa1 outputted from the switch judging and gradual change gain generating section 220, and the multiplication result is outputted as a steering angle control current command value IrefP. The steering angle control output gradual change gain Gfa1 is used in order to smoothly perform the switching operation between the manual steering state and the automatic steering state and to achieve uncomfortable feeling to a driver, safety and so on. At the multiplying section 242, the assist control current command value IrefT1 outputted from the assist control section 230 is multiplied by the assist control output gradual change gain Gft1, and the multiplication result is outputted as an assist control current command value IrefT. The assist control output gradual change gain Gft1 is used in order to smoothly perform the switching operation between the manual steering state and the automatic steering state and to achieve steering intervention by a driver in the automatic steering. At the adding section 243, the steering angle control current command value IrefP and the assist control current command value IrefT are added, and the addition result is outputted as the current command value Iref.

The assist map gradual change gain Gft2 used in the above assist control section 230 is also used for the same purpose as the assist control output gradual change gain Gft1. In the automatic steering state, setting the Gft1 to the $\alpha t1$ and the Gft2 to the $\alpha t2$ as shown in FIGS. 6B and 6C and adjusting the $\alpha t1$ and the $\alpha t2$, enable improvement of safety of the system and suppression of occurrence of the vibration. Further, if it is possible to maintain the safety of the system in the automatic steering state, it is possible to set the $\alpha t1$ 0% on and the $\alpha t2$ to 100% simply. In this case, since the $\alpha t1$ is 0%, the assist control current command value IrefT becomes a zero command, and this means to achieve the steering intervention even without the assist control.

In such a configuration, an operating example of the EPS-side-ECU 200 will be described with reference to flowcharts shown in FIGS. 16 to 19.

When the operation is started, the EPS state quantity detecting section 210 detects the actual steering angle $\theta r$, the steering torque Tt and the vehicle speed V (Step S10), outputs the actual steering angle $\theta r$ to the steering angle control section 300, outputs the steering torque Tt to the switch judging and gradual change gain generating section 220, the steering angle control section 300 and the assist control section 230, and outputs the vehicle speed V to the steering angle control section 300 and the assist control section 230. Furthermore, the EPS state quantity detecting section 210 calculates the actual steering angular velocity $\omega r$ by the actual steering angle $\theta r$ (Step S20), and outputs the actual steering angular velocity $\omega r$ to the steering angle control section 300.

The switch judging and gradual change gain generating section 220 inputting the steering torque Tt judges the switching between the automatic steering and the manual steering based on the presence/absence of the input of switch signal SW outputted from the vehicle-side-ECU 100, determines the gradual change gains on the basis of the judgment result (Step S30), outputs the gradual change gains Gfa2, Gfa3 and Gfa4 to the steering angle control section 300, outputs the Gft2 to the assist control section 230, and outputs the Gfa1 and the Gft1 to the switching section 240. A detailed operation of the switch judging and gradual change gain generating section 220 will be described below.

The steering angle control section 300 inputs the steering angle command value $\theta ref$ outputted from the vehicle-side-ECU 100, the actual steering angle $\theta r$, the actual steering angular velocity $\omega r$, the steering torque Tt and the vehicle speed V which are outputted from the EPS state quantity detecting section 210, and the gradual change gains Gfa2, Gfa3 and Gfa4 outputted from the switch judging and gradual change gain generating section 220, calculates the steering angle control current command value IrefP1 by using them (Step S40), and outputs the steering angle control current command value IrefP1 to the switching section 240. A detailed operation of the steering angle control section 300 will be described below.

The assist control section 230 inputs the steering torque Tt, the vehicle speed V and the assist map gradual change gain Gft2, and calculates the assist map output current (current value) by the same operation as the current command value calculating section 31 shown in FIG. 2 (Step S50). The assist control section 230 multiplies the assist map output current by the assist map gradual change gain Gft2 (Step S60), performs the same operations as the adding section 32A, the current limiting section 33 and the compensation signal generating section 34 which are shown in FIG. 2 to the multiplication result, calculates the assist control current command value IrefT1 (Step S70), and outputs the assist control current command value IrefT1 to the switching section 240.

The switching section 240 multiplies the inputted steering angle control current command value IrefP1 by the steering angle control output gradual change gain Gfa1 at the multiplying section 241 (Step S80), and outputs the steering angle control current command value IrefP being the multiplication result to the adding section 243. Further, the switching section 240 multiplies the inputted assist control current command value IrefT1 by the assist control output gradual change gain Gft1 at the multiplying section 242 (Step S90), and outputs the assist control current command value IrefT being the multiplication result to the adding section 243. The adding section 243 adds the steering angle control current command value IrefP and the assist control current command value IrefT (Step S100), and outputs the current command value Iref being the addition result to the current control and driving section 250.

By using the current command value Iref and the motor current Im detected by the motor current detector 38, the current control and driving section 250 performs the control so that the motor current Im follows the current command value Iref by the same operations as the subtracting section 32B, the PI-control section 35, the PWM-control section 36 and the inverter 37 which are shown in FIG. 2 (Step S110), and drives and controls the motor.

Figure 17:
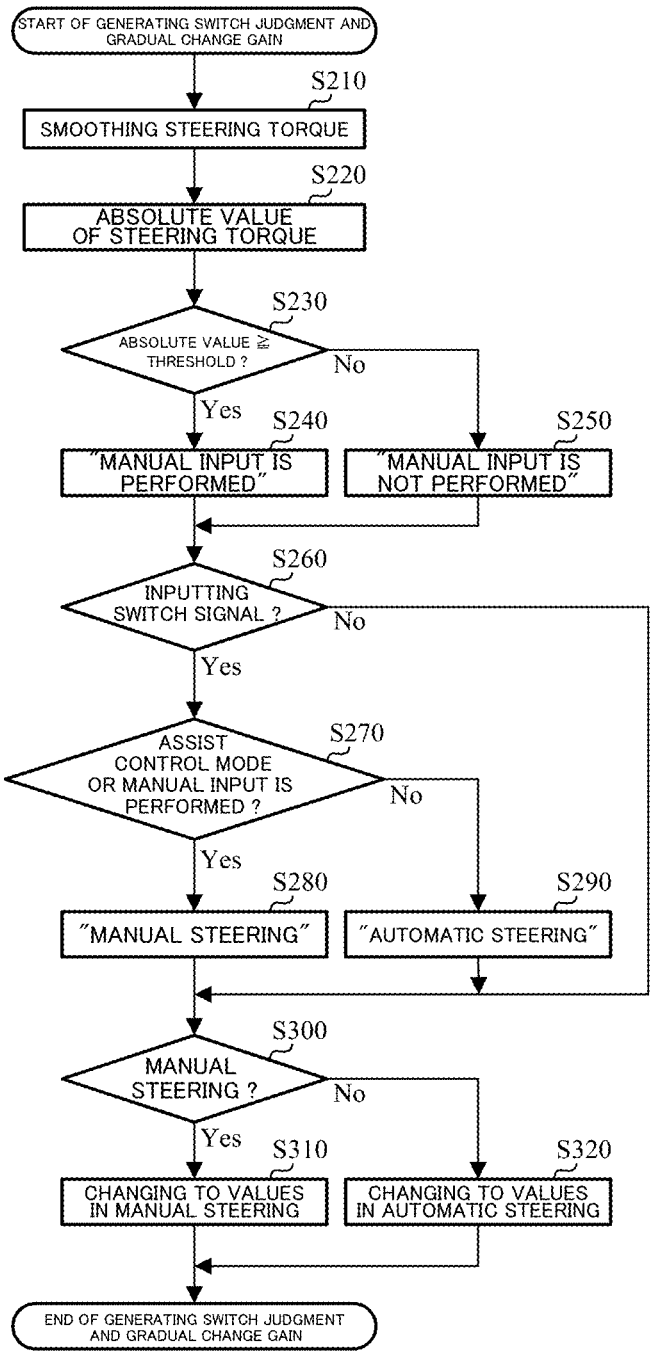
FIG. 17 is a flowchart showing an operating example of the switch judging and gradual change gain generating section.

The detail of the operating example of the switch judging and gradual change gain generating section 220 will be described with reference to a flowchart shown in FIG. 17. Moreover, the "manual steering" is set on the steering state judgment signal Js as an initial value in the steering state judging section 224.

The inputted steering torque Tt is inputted into the manual input judging section 223 in the switch judging section 221. The manual input judging section 223 smoothes the steering torque Tt at the smoothing filter section 225 (Step S210), and obtains the absolute value |Tt'| of the steering torque Tt' obtained by the smoothing at the absolute value processing section 226 (Step S220). The absolute value |Tt'| is inputted into the judgment processing section 227. When the absolute value |Tt'| is larger than or equal to the threshold Tth (Step S230), the judgment processing section 227 judges that "the manual input is performed" (Step S240). When the absolute value |Tt'| is smaller than the threshold Tth (Step S230), the judgment processing section 227 judges that "the manual input is not performed" (Step S250). The judgment processing section 227 outputs the manual input judgment signal Jh being the judgment result to the steering state judging section 224.

The steering state judging section 224 confirms whether the switch signal SW is inputted or not (Step S260). In the case of inputting the switch signal SW, the steering state judging section 224 updates the steering state judgment signal Js to the "manual steering" (Step S280) when the switch signal SW indicates the "assist control mode" or the manual input judgment signal Jh indicates that "the manual input is performed" (Step S270), otherwise (Step S270), the steering state judging section 224 updates the steering state judgment signal Js to the "automatic steering" (Step S290). In the case of not inputting the switch signal SW, the steering state judgment signal Js is left as it is. The steering state judgment signal Js is inputted into the gradual change gain generating section 222.

The gradual change gain generating section 222 confirms the value of the steering state judgment signal Js (Step S300). When the steering state judgment signal Js is the "manual steering", the gradual change gain generating section 222 changes the respective gradual change gains (Gfa1 to Gfa4, Gft1 and Gft2) to the values in the manual steering state (0% for Gfa1 to Gfa4, and 100% for Gft1 and Gft2) (Step S310). When the steering state judgment signal Js is the "automatic steering", the gradual change gain generating section 222 changes the respective gradual change gains to the values in the automatic steering state (100% for Gfa1 to Gfa4, $\alpha$t1 for Gft1, and $\alpha$t2 for Gft2) (Step S320).

The detail of the operating example of the steering angle control section 300 will be described with reference to flowcharts shown in FIGS. 18 and 19.

The steering angle command value variable limiting section 310 confirms the value of the inputted steering angle command gradual change gain Gfa4 (Step S410). The steering angle command value variable limiting section 310 sets the limit values to the limit values "in the manual steering" shown in FIG. 8 (Step S420) when the Gfa4 is 0%, sets the limit values to the limit values "in the automatic steering" shown in FIG. 8 (Step S430) when the Gfa4 is 100%, and sets the limit values to intermediate values (Step S440) when the Gfa4 is between 0% and 100%. The steering angle command value variable limiting section 310 limits the steering angle command value $\theta$ref inputted from the vehicle-side-ECU 100 by using the set limit values (Step S450), and outputs the steering angle command value $\theta$ref1.

The steering angle command value $\theta$ref1 is inputted into the variable rate limiting section 320 with the steering angle command gradual change gain Gfa4 and the actual steering angle $\theta$r. The variable rate limiting section 320 confirms the value of the steering angle command gradual change gain Gfa4 (Step S460). When the Gfa4 is 0%, the variable rate limiting section 320 sets the limit value to zero (Step S470), and sets the value of the stored previous steering angle command value $\theta$ref1 to the value of the actual steering angle $\theta$r (Step S471). The step S471 is a step for suppressing a sudden change of the steering angle command value by starting in a state of matching the steering angle command value $\theta$ref1 with the actual steering angle $\theta$r because a value at the time of terminating the previous steering control remains at the time of starting the steering control where the Gfa4 becomes larger than 0% and a steering wheel may suddenly move by the sudden change if using its value as it is. The variable rate limiting section 320 sets the limit value to the predetermined value (Step S480) when the Gfa4 is 100%, and sets the limit value to the intermediate value (Step S490) when the Gfa4 is between 0% and 100%. The variable rate limiting section 320 calculates the difference (the change amount) between the steering angle command value $\theta$ref1 and the previous steering angle command value $\theta$ref1 (Step S500). When the absolute value of the change amount is larger than the limit value (Step S510), the variable rate limiting section 320 increases or decreases the steering angle command value $\theta$ref1 so that the absolute value of the change amount becomes the limit value (Step S520), and outputs the result as the steering angle command value $\theta$ref2 (Step S530). When the absolute value of the change amount is smaller than or equal to the limit value (Step S510), the variable rate limiting section 320 outputs the steering angle command value $\theta$ref1 as the steering angle command value $\theta$ref2 (Step S530).

The steering angle command value $\theta$ref2 is multiplied by the steering angle command gradual change gain Gfa4 at the multiplying section 391 (Step S540), and the multiplication result is outputted as the steering angle command value $\theta$ref3. The steering angle command value $\theta$ref3 is inputted into the steering wheel vibration eliminating section 330.

The steering wheel vibration eliminating section 330 reduces the steering angle command value θref3 by the vibration frequency component (Step S550), and outputs the reduction result as the target steering angle θt to the position control section 340.

The target steering angle θt is addition-inputted into the subtracting section 342 in the position control section 340. The actual steering angle θr has been subtraction-inputted into the subtracting section 342, and the deviation θe between the target steering angle θt and the actual steering angle θr is obtained at the subtracting section 342 (Step S560). The deviation θe is inputted into the proportional gain section 341. The proportional gain section 341 multiplies the deviation θe by the proportional gain Kpp, and calculates the steering angular velocity command value ωref1 (Step S570). The steering angular velocity command value ωref1 is inputted into the adding section 393.

Meanwhile, the steering intervention compensating section 350 inputs the vehicle speed V and the steering torque Tt, and the vehicle speed V and the steering torque Tt are inputted into the compensation gain section 351. The compensation gain section 351 obtains the steering intervention compensation gain Ktp by the vehicle speed V on the basis of the characteristic shown in FIG. 11, and calculates the steering angular velocity command value ωreft by multiplying the steering torque Tt by the steering intervention compensation gain Ktp (Step S580). The steering angular velocity command value ωreft is inputted into the steering intervention phase compensating section 352. The steering intervention phase compensating section 352 transforms the steering angular velocity command value ωreft into the steering angular velocity command value ωref2 by the phase compensation (Step S590). The steering angular velocity command value ωref2 is inputted into the adding section 393.

The steering angular velocity command values ωref1 and ωref2 inputted into the adding section 393 are added (Step S600), and the addition result is outputted as the steering angular velocity command values ωref. The steering angular velocity command values ωref is multiplied by the velocity command gradual change gain Gfa3 at the multiplying section 392 (Step S610), and the multiplication result is inputted as the steering angular velocity command values ωrefg into the velocity command value variable limiting section 360.

The velocity command value variable limiting section 360 inputs the velocity command gradual change gain Gfa3 with the steering angular velocity command values ωrefg, and confirms the value of the velocity command gradual change gain Gfa3 (Step S620). The velocity command value variable limiting section 360 sets the limit values to the limit values shown by "Gfa3 SMALL" in FIG. 12 (Step S630) when the Gfa3 is smaller than the predetermined threshold, and sets the limit values to the limit values shown by "Gfa3 LARGE" (Step S640) when the Gfa3 is larger than or equal to the predetermined threshold. The velocity command value variable limiting section 360 limits the steering angular velocity command values ωrefg by using the set limit values (Step S650), and outputs the target steering angular velocity ωt. The target steering angular velocity ωt is inputted into the steering angular velocity control section 370.

The steering angular velocity control section 370 inputs the actual steering angular velocity ωr and the velocity control gradual change gain Gfa2 with the target steering angular velocity ωt. The target steering angular velocity ωt is addition-inputted into the subtracting section 374, the actual steering angular velocity ωr is subtraction-inputted into the subtracting section 374, and the deviation ωe between the target steering angular velocity ωt and the actual steering angular velocity ωr is inputted into the gain multiplying section 371 (Step S660). The gain multiplying section 371 multiplies the deviation ωe by the gain Kvi (Step S670), and outputs the operation amount D1. The operation amount D1 is inputted into the integrating section 373. The integrating section 373 calculates the control amount Ir1 by integrating the operation amount D1 (Step S680), and outputs the control amount Ir1 to the multiplying section 376. The multiplying section 376 multiplies the control amount Ir1 by the velocity control gradual change gain Gfa2 (Step S690), and outputs the control amount Ir3. The control amount Ir3 is addition-inputted into the subtracting section 375. The actual steering angular velocity ωr is inputted also into the gain multiplying section 372. The gain multiplying section 372 multiplies the actual steering angular velocity ωr by the gain Kvp (Step S700), and outputs the control amount Ir2. The control amount Ir2 is subtraction-inputted into the subtracting section 375. At the subtracting section 375, the deviation between the control amounts Ir3 and Ir2 is calculated (Step S710), and is outputted as the steering angle control current command value IrefW to the adding section 394.

The steering torque Tt is inputted also into the steering wheel damping section 380. In the steering wheel damping section 380, the gain section 381 multiplies the inputted steering torque Tt by the gain Kv (Step S720), and outputs the control amount Irv. The control amount Irv is phase-compensated at the damping phase compensating section 382 (Step S730), and the phase compensation result is outputted as the steering angle control current command value IrefV. The steering angle control current command value IrefV is outputted to the adding section 394.

The steering angle control current command values IrefW and IrefV inputted into the adding section 394 are added (Step S740), and the addition result is inputted as the steering angle control current command value IrefP2 into the steering angle control current command value limiting section 390.

The steering angle control current command value limiting section 390 limits the steering angle control current command value IrefP2 by using the limit values of the characteristic shown in FIG. 15, and outputs the steering angle control current command value IrefP1 (Step S750).

Moreover, the order of the operation of the steering angle control section 300 and the operation of the assist control section 230 may be reversed, or the operations may be performed in parallel. In the operation of the steering angle control section 300, the order of the operation to the calculation of the steering angular velocity command value ωref1 and the operation to the calculation of the steering angular velocity command value ωref2, which are inputted into the adding section 393, the order of the operation to the calculation of the steering angle control current command value IrefW and the operation to the calculation of the steering angle control current command value IrefV, which are inputted into the adding section 394, and so on, may be reversed respectively, or both operations may be performed in parallel respectively.

Effects of the present embodiment will be described based on results of simulations.

Figure 20:
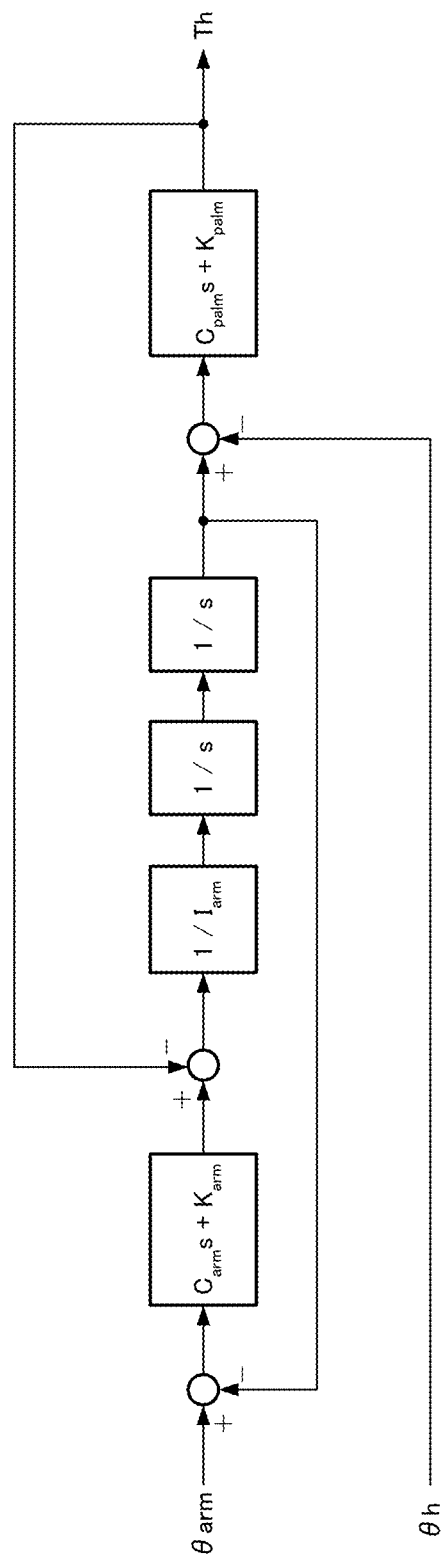
FIG. 20 is a block diagram showing an example of a steering model of a driver used in simulations.

In the simulations, a vehicle motion model and a steering model of a driver are set as a plant model of the plant 400. It is possible to use a model shown in, for example, "Motion and control of an automobile", Masato Abe, Tokyo Denki University, Tokyo Denki University Press, published on Sep. 20, 2009, second impression of first edition, chapter 3 (p. 49-105), chapter 4 (p. 107-130) and chapter 5 (p. 131-147), as the vehicle motion model, and use a model shown in, for example, "A study with respect to an estimation of steering feeling of a vehicle considering a musculoskeletal characteristic of an arm", Daisuke Yokoi, master's thesis, Master's Programs, Mechanical Engineering, Graduate School of Engineering, Mie University, received on Feb. 6, 2007, chapter 2 (p. 3-5) and chapter 3 (p. 6-9) (Reference Document) as the steering model. It is possible to use another model without limited to these. The steering model used in the present simulation is shown in FIG. 20 as a reference. In FIG. 20, $C_{arm}$ and $C_{palm}$ are viscosity coefficients, $K_{arm}$ and $K_{palm}$ are spring constants, and $I_{arm}$ is an inertia moment of an arm. The steering wheel angle θh is inputted from a mechanical model (a mechanical transfer characteristic) to the steering model (a steering transfer characteristic of a driver), and the steering wheel manual input torque Th is outputted from the steering model to the mechanical model. Hereinafter, a target angle described in Reference Document is referred to a driver's target angle (a steering target angle) θarm. Further, the model shown in Reference Document adds a mass system of an arm to a column inertia moment, however, by defining a force applied from a palm to a steering wheel as the steering wheel manual input torque Th, no hindrance occurs even if performing a simulation assuming that the spring constant $K_{palm}$ and the viscosity coefficient $C_{palm}$ which operate between an angle of a palm and the steering wheel angle θh are large enough, and the present simulation is performed in this way. It is also assumed that followability of a motor current to a current command value is fast enough, an influence by operation of the current control and driving section 250 is slight, and the current command value is equal to the motor current. Furthermore, the vehicle speed is assumed constant.

First, an effect of the steering intervention compensation will be described.

Figure 21:
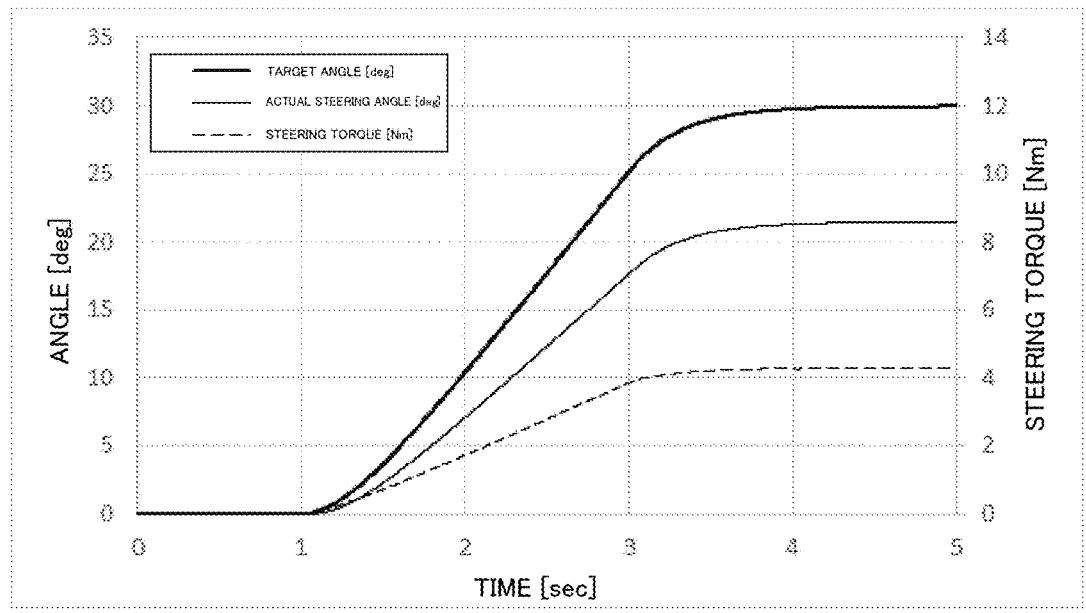
FIG. 21 is a graph showing an example of time responses of a target angle, an actual steering angle and a steering torque in a simulation with respect to steering intervention compensation.

Assuming the steering angle command value θref to be constant at 0 [deg], a simulation of the automatic steering where the driver's target angle θarm is inputted is performed. As a reference, time responses of the actual steering angle θr and the steering torque Tt to a time change of the driver's target angle θarm in a simulation considering the steering model of the driver under the same conditions, are shown in FIG. 21. In FIG. 21, the vertical axis indicates an angle [deg] and a steering torque [Nm], the horizontal axis indicates a time [sec], the thick solid line shows the driver's target angle θarm, the thin solid line shows the actual steering angle (the steering wheel angle in the present embodiment) θr, and the broken line shows the steering torque Tt. Moreover, in FIG. 21, the assist control output gradual change gain Gft1 is 0%, that is, the assist control does not operate. Further, FIG. 21 shows an example of a simulation for describing a situation where the actual steering angle θr and the steering torque Tt are changed as the driver's target angle θarm is changed.

With respect to changes of the actual steering angle θr and the steering torque Tt in the case of inputting the driver's target angle θarm like this, the case of performing velocity control by a PI-control without the steering intervention compensation and the case of performing the steering intervention compensation are compared. In the former case, the assist control output gradual change gain Gft1 and the assist map gradual change gain Gft2 are set to 100% for comparison with the present embodiment, and difference between the integral methods is verified. In the latter case, the assist control output gradual change gain Gft1 is set to 0%. Further, in a conventional prior art (for example, Patent Document 1), an assist control command value is 0 [deg] in the steering control before the switching, however, since the steering intervention in this case is presumed to be more difficult than in the former case, this case is omitted.

Figure 22:
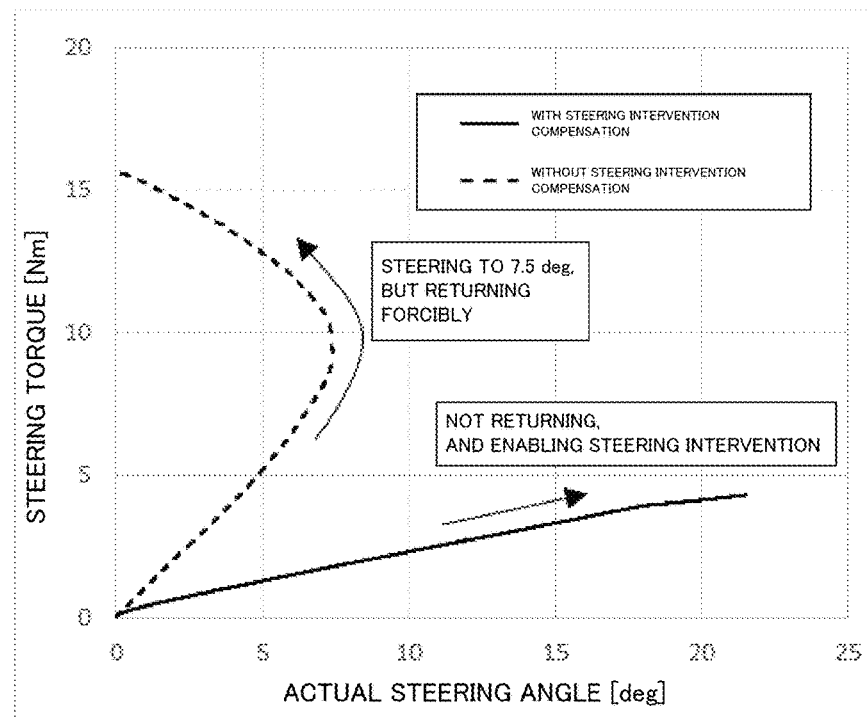
FIG. 22 is a graph showing an example of changing the actual steering angle and the steering torque in the simulation with respect to the steering intervention compensation.

A result of the simulation is shown in FIG. 22. The vertical axis indicates a steering torque [Nm], the horizontal axis indicates an actual steering angle [deg], the broken line shows the case without the steering intervention compensation, and the solid line shows the case with the steering intervention compensation.

As shown by the broken line in FIG. 22, in the case without the steering intervention compensation, the steering can be performed until the actual steering angle θr becomes 7.5 [deg], however, since a velocity deviation (a deviation between the steering angular velocity command value and the actual steering angular velocity) is continuously stored by the influence of the integral of the PI-control in the velocity control, the steering forcibly returns to the position corresponding to the steering angle command value θref (=0 [deg]) eventually. Moreover, a very large steering torque being larger than or equal to 15 [Nm] occurs, and the steering by the driver becomes difficult.

On the other hand, as shown by the solid line in FIG. 22, in the case with the steering intervention compensation, the steering can be performed until the actual steering angle θr becomes about 22 [deg], and does not return to the position corresponding to the steering angle command value θref (=0 [deg]). This is because the steering angular velocity command value ωref2 outputted from the steering intervention compensating section 350 is added to the steering angular velocity command value ωref1 outputted from the position control section 340, and the velocity deviation between the steering angular velocity command value ωref and the actual steering angular velocity ωr in the steering state balances in the vicinity of 0. Thus, the function of the steering intervention compensating section 350 enables the steering intervention by the driver. Further, an increase in the steering intervention compensation gain Ktp enables easier steering.

Next, an effect for a steering wheel vibration occurring in the steering angle control performed during the automatic steering in the case of performing only the steering angle control without the steering intervention by the driver (the steering wheel manual input torque Th=0 [Nm]), will be described.

Before describing the effect for the steering wheel vibration, followability to the steering angle command value θref will be described in order to describe a situation where the actual steering angle θr follows the steering angle command value θref.

Figure 23:
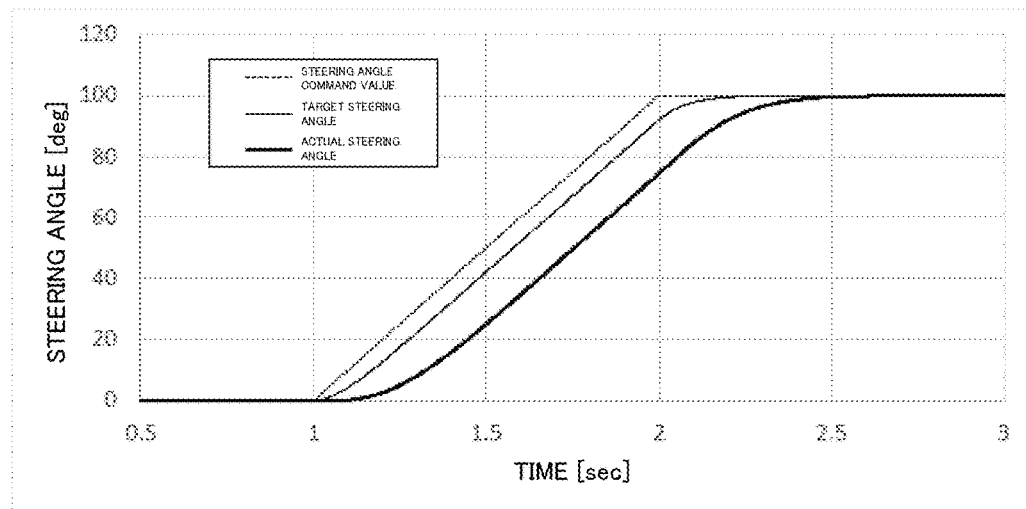
FIG. 23 is a graph showing a result of a simulation with respect to followability to a steering angle command value.

FIG. 23 shows an example of a time response in the case of changing the steering angle command value θref from 0 [deg] to 100 [deg] in a ramp state. In FIG. 23, the vertical axis indicates a steering angle [deg], the horizontal axis indicates a time [sec], and the dotted line shows the steering angle command value θref. Situations of responses of the target steering angle θt outputted from the steering wheel vibration eliminating section 330 having a primary LPF whose cutoff frequency is 2 Hz and the actual steering angle θr to the steering angle command value θref, are shown by the thin solid line and the thick solid line respectively. From FIG. 23, it is found out that the target steering angle θt and the actual steering angle θr follow the steering angle command value θref.

From the above description, it can be said that both the steering intervention and the follow-up of the steering angle during the automatic steering can be achieved.

Figure 24:
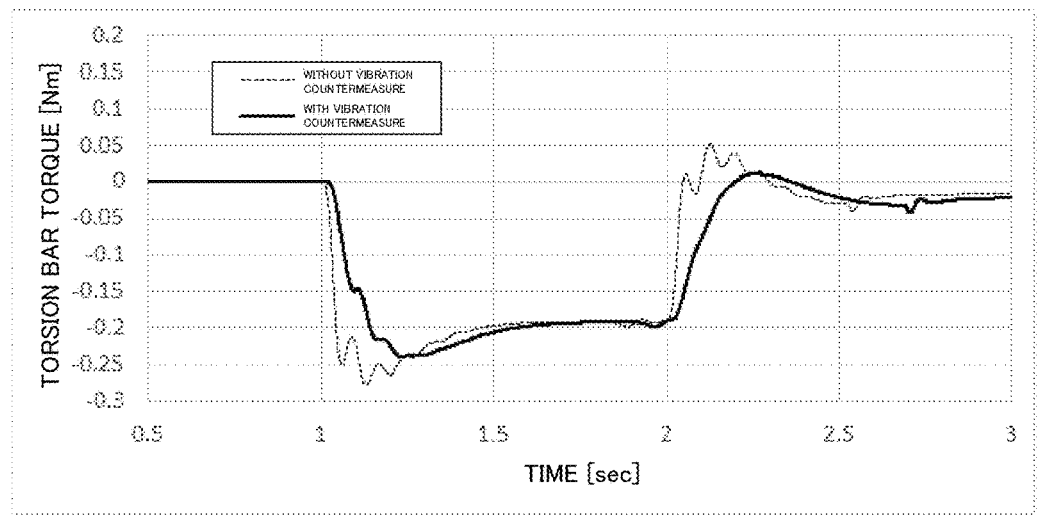
FIG. 24 is a graph showing a result of a simulation with respect to a steering wheel vibration.

In the simulation for verifying the effect for the steering wheel vibration, a difference of a time response of a torsion bar torque between with and without the steering wheel vibration eliminating section 330 and the steering wheel damping section 380, is examined in the case of performing the steering angle control with respect to the same steering angle command value θref as shown in FIG. 23. The steering wheel vibration eliminating section 330 uses the primary LPF whose cutoff frequency is 2 Hz. The steering wheel damping section 380 uses the gain Kv by which a torque converted into a column shaft becomes equivalent to 10 Nm for the torsion bar torque being 1 Nm, and performs phase advance compensation by a primary filter where a cutoff frequency of a numerator is 10 Hz and a cutoff frequency of a denominator is 20 Hz. The result is shown in FIG. 24. In FIG. 24, the vertical axis indicates a torsion bar torque [Nm], the horizontal axis indicates a time [sec], the solid line shows the case with the vibration countermeasure by the steering wheel vibration eliminating section 330 and the steering wheel damping section 380, and the dotted line shows the case without the vibration countermeasure. From FIG. 24, it is found out that the steering wheel vibration is suppressed by the steering wheel vibration eliminating section 330 and the steering wheel damping section 380.

As the last of the description of the effect, an effect for a problem that the integral value of the I-control accumulates excessively by increase in the steering angular velocity at the start of the steering angle control and the steering angle control command value may become excessive (a problem in Patent Document 3 and so on), will be described.

Figure 25:
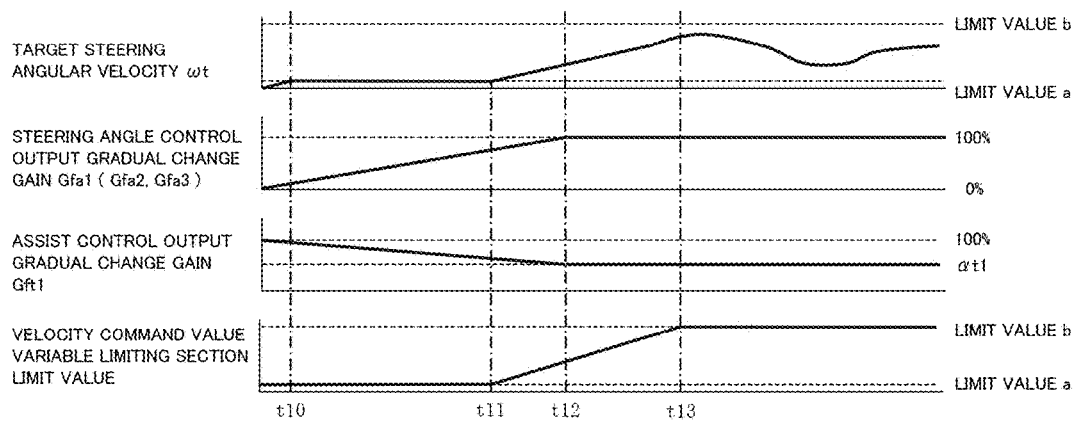
FIG. 25 is a graph showing an example (the first embodiment) of changing a target steering angular velocity, gradual change gains and a limit value in the case of transferring a steering state.

FIG. 25 shows time changes of the target steering angular velocity ωt, the gradual change gains and the limit value used at the velocity command value variable limiting section 360 when the state changes from the manual steering state to the automatic steering state. Assuming that the velocity control gradual change gain Gfa2 and the velocity command gradual change gain Gfa3 are changed synchronizing with the steering angle control output gradual change gain Gfa1, only the Gfa1 is shown in FIG. 25. Assuming that the assist control output gradual change gain Gft1 and the assist map gradual change gain Gft2 are also changed synchronizing with the Gfa1, only the situation of the change of the Gft1 is shown as a reference. Further, the magnitude of the limit value used at the velocity command value variable limiting section 360 is set so as to be fixed at a small value when the Gfa3 is smaller than the predetermined threshold, and gradually increase when the Gfa3 is larger than or equal to the predetermined threshold.

The steering angular velocity command value ωref is multiplied by the velocity command gradual change gain Gfa3, is limited at the velocity command value variable limiting section 360, and becomes the target steering angular velocity ωt. When the transference from the manual steering state to the automatic steering state starts, the Gfa3 gradually increases from 0, and the target steering angular velocity ωt also gradually increases from 0. After that, when the steering angular velocity command value ωrefg inputted into the velocity command value variable limiting section 360 reaches the limit value (the limit value "a") at the time point t10, the target steering angular velocity ωt becomes constant at the limit value "a", however, the Gfa3 continuously increases. When the Gfa3 becomes the predetermined threshold at the time point t11, the limit value gradually increases, and the target steering angular velocity ωt also increases correspondingly. When the Gfa3 becomes 100% at the time point t12, in addition, the limit value becomes the limit value "b" at the time point t13, the target steering angular velocity ωt changes within the limit value "b". Since the target steering angular velocity ωt is limited by the limit value "a" and is limited by multiplication of the velocity control gradual change gain Gfa2 at the steering angular velocity control section 370 between the time points t10 and t13, excessive accumulation of the integral value in the steering angular velocity control section 370 is suppressed, and the current command value causing uncomfortable feeling to a driver as an output of the steering angle control can be reduced. After the transition of the limit value is ended (that is, after the time point t13), the steering angular velocity command value ωref is not limited by the Gfa3 and the velocity command value variable limiting section 360, and a signal in the steering angular velocity control section 370 is not also limited by the Gfa2, so that it is possible to shift to the normal steering angle control.

Moreover, with respect to the multiplications of the respective gradual change gains (Gfa1 to Gfa4, Gft1 and Gft2) in the first embodiment, in such a case of focusing on a cost more than the effect by the multiplication of the gradual change gain, it is possible to leave at least one multiplication and omit other multiplications. Further, the respective limiting sections (the steering angle command value variable limiting section, the variable rate limiting section, the velocity command value variable limiting section and the steering angle control current command value limiting section) are also possible to omit in the same case or the like. When the steering angle command value variable limiting section 310, the variable rate limiting section 320 and the multiplying section 391, in addition, the steering wheel vibration eliminating section 330 are omitted, the steering angle command value θref is inputted into the position control section 340 as the target steering angle θt. When the multiplying section 392 and the velocity command value variable limiting section 360 are omitted, the steering angular velocity command value ωref is inputted into the steering angular velocity control section 370 as the target steering angular velocity ωt.

A second embodiment of the present invention will be described.

Figure 26:
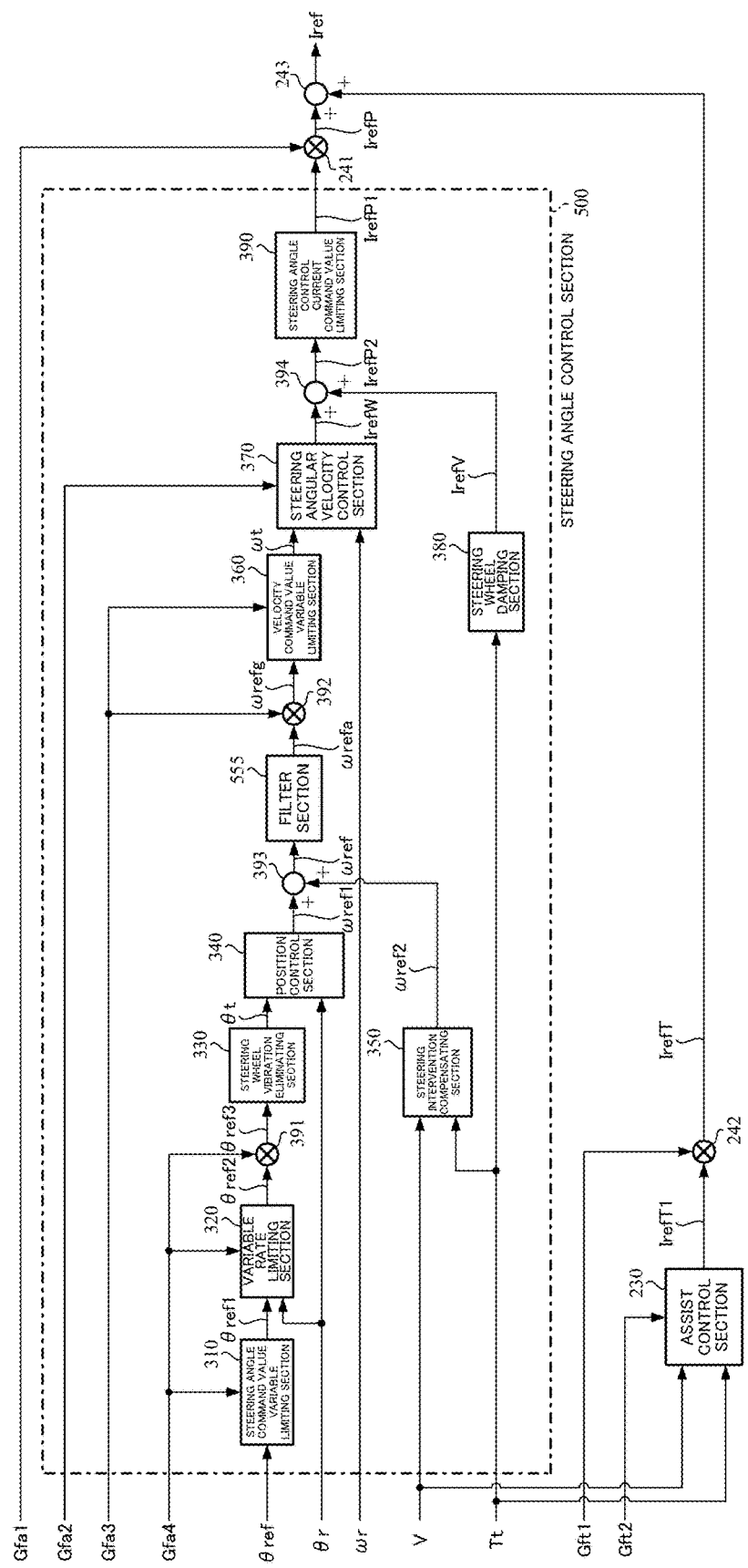
FIG. 26 is a block diagram showing a configuration example (a second embodiment) of a steering angle control section and a switching section.

In order to improve the responsiveness in the steering angle control and the steering intervention, the second embodiment applies processing by a feedforward (FF) filter to the steering angular velocity command value, and performs the steering angular velocity control by using a steering angular velocity command value obtained by applying the processing (an extended steering angular velocity command value). To achieve this, compared with the first embodiment, a configuration of a steering angle control section is different. A configuration example of a steering angle control section 500 in the second embodiment is shown in FIG. 26. Compared with the steering angle control section 300 in the first embodiment shown in FIG. 7, a filter section 555 is inserted between the adding section 393 and the multiplying section 392. The steering angular velocity command value ωref outputted from the adding section 393 is inputted into not the multiplying section 392 but the filter section 555, and a steering angular velocity command value (an extended steering angular velocity command value) ωrefa outputted from the filter section 555 is inputted into the multiplying section 392.

The filter section 555 has an FF filter, and transforms the steering angular velocity command value ωref into the steering angular velocity command value ωrefa by the FF filter. By using the FF filter, it is possible to extend a band where the actual steering angular velocity ωr is controlled with respect to the steering angular velocity command value ωref to a high frequency side, and to improve the responsiveness of the velocity control operating as an inner loop of the steering angle control. If the responsiveness of the velocity control is improved, gains of the position control (the steering angle control) and the steering intervention compensation which are outside the velocity control are possible to largely adjust without overshooting, so that the responsiveness in the steering angle control and the steering intervention are possible to improve as a result. The filter section 555 uses, for example, a filter which performs phase advance compensation and where a cutoff frequency of a numerator is 3 Hz and a cutoff frequency of a denominator is 5 Hz as the FF filter.

Compared with the operating example of the first embodiment, an operating example of the second embodiment is different in that the operation of the filter section 555 is added to the operations of the steering angle control section. That is, in the operating example of the steering angle control section 300 in the first embodiment shown in FIGS. 18 and 19, the second embodiment performs the same operations as the first embodiment until the step S600 where the steering angular velocity command values ωref1 and ωref2 are added at the adding section 393 and the addition result is outputted as the steering angular velocity command value ωref, and the steering angular velocity command value ωref is inputted into the filter section 555. The filter section 555 transforms the steering angular velocity command value ωref into the steering angular velocity command value ωrefa, and outputs the steering angular velocity command value ωrefa to the multiplying section 392. The operations (from Step S610) after multiplying the steering angular velocity command value ωrefa by the velocity command gradual change gain Gfa3 at the multiplying section 392 are the same as the first embodiment.

An effect by the FF filter of the filter section 555 in the second embodiment will be described based on a result of a simulation.

Figure 27A:
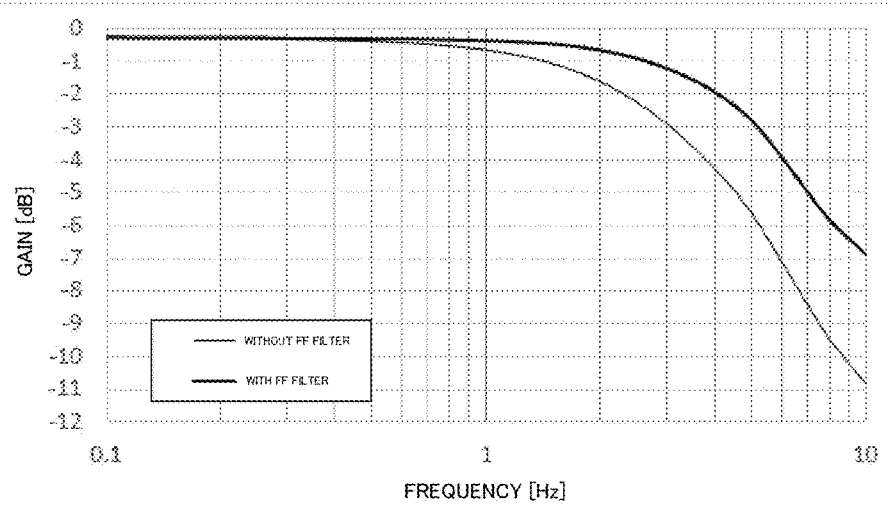
FIGS. 27A and 27B are characteristic diagrams showing an example of a frequency characteristic from a steering angular velocity command value to an actual steering angular velocity in a simulation with respect to a feedforward (FF) filter.
Figure 27B:
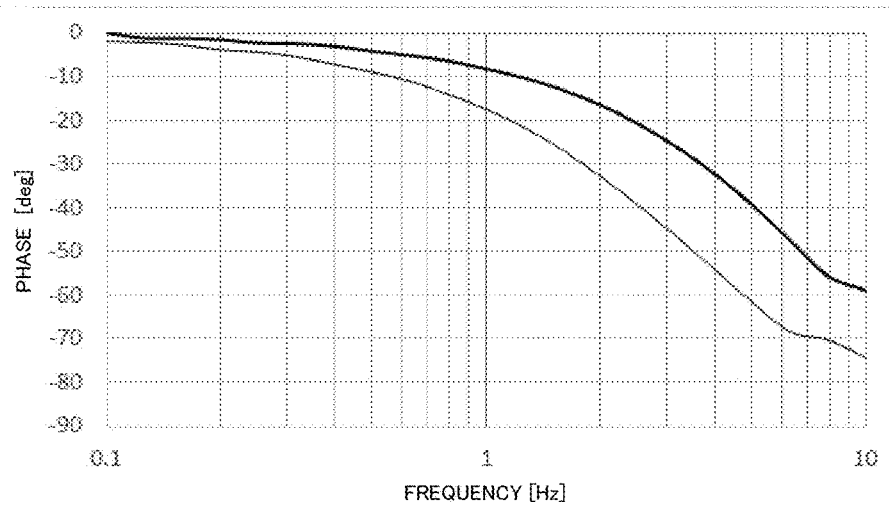

In the simulation of the FF filter, first, frequency characteristics from the steering angular velocity command value ωref to the actual steering angular velocity ωr are compared in the case without the FF filter and in the case with the FF filter. As the FF filter, a filter which performs phase advance compensation and where a cutoff frequency of a numerator is 3 Hz and a cutoff frequency of a denominator is 5 Hz, is used, and the case without the FF filter is simulated by using a gain whose magnitude is 1. The result is shown in FIGS. 27A and 27B. FIG. 27A shows a gain characteristic, FIG. 27B shows a phase characteristic, the thin solid line shows the case without the FF filter, and the thick solid line shows the case with the FF filter. In the case of defining a response frequency (a threshold frequency) of the steering angular velocity control as a frequency where the gain is attenuated to −3 dB, the response frequency is about 3 Hz in the case without the FF filter (shown by the thin solid line), is about 5 Hz in the case with the FF filter (shown by the thick solid line), and becomes a higher value in the case with the FF filter. Therefore, it can be found out that the response of the steering angular velocity control is improved by the FF filter.

Figure 28A:
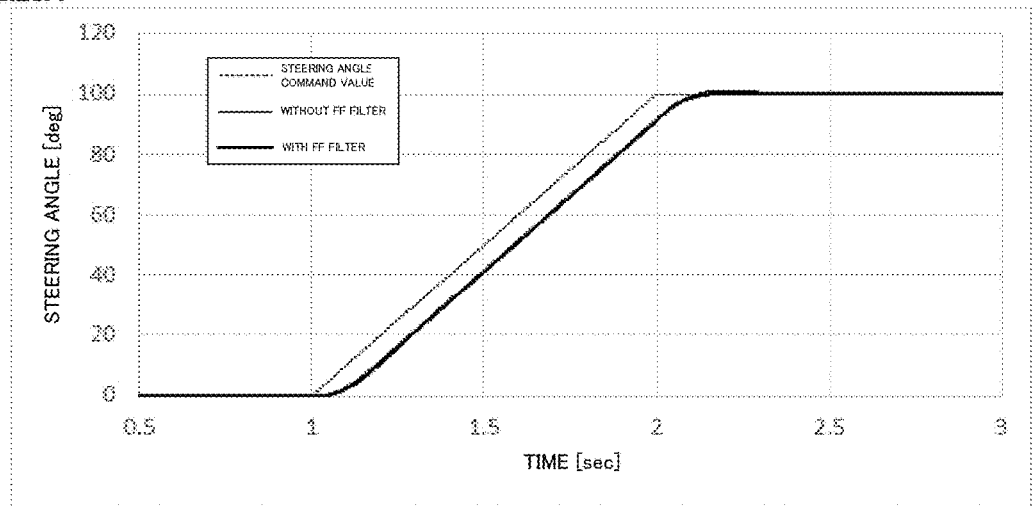
FIGS. 28A and 28B are graphs showing a result of the simulation with respect to the FF filter
Figure 28B:
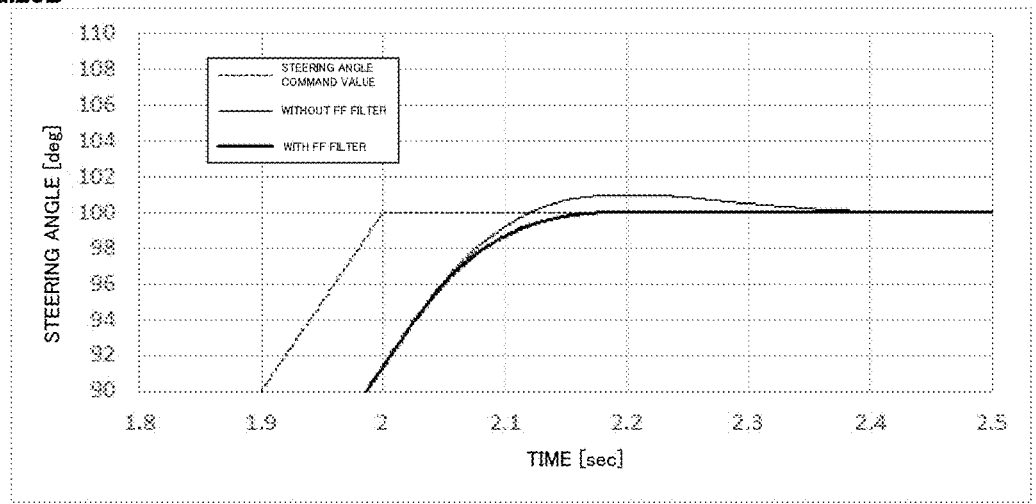

The proportional gain Kpp used in the position control section 340 of the steering angle control section 500 is possible to increase by using the FF filter. This leads to an effect of enabling improvement of the responsiveness of the steering angle control. In order to verify this effect, a simulation is performed by changing the simulation conditions set for the time response of the steering angle control shown in FIG. 23. Specifically, the proportional gain Kpp is doubled, and it is assumed that the steering wheel vibration eliminating section 330 does not exist by using a gain whose magnitude is 1 as the steering wheel vibration eliminating section 330. Time responses under these conditions are shown in FIGS. 28A and 28B. As with FIG. 23, FIGS. 28A and 28B show time responses in the case of changing the steering angle command value θref from 0 [deg] to 100 [deg] in a ramp state, the vertical axis indicates a steering angle [deg], the horizontal axis indicates a time [sec], and the dotted line shows the steering angle command value θref. With respect to the steering angle command value θref, the time response in the case without the FF filter is shown by the thin solid line, and the time response in the case with the FF filter is shown by the thick solid line. To clarify a difference, the graph obtained by enlarging a part of FIG. 28A is shown in FIG. 28B. From FIGS. 28A and 28B, it is found out that the steering angle overshoots from 2.1 sec past to about 2.4 sec in the case without the FF filter, however, the steering angle follows the steering angle command value θref without overshooting in the case with the FF filter. Since the responsiveness of the steering angular velocity control is improved by using the FF filter, the overshoot becomes hard to occur even if the proportional gain Kpp is increased. As a result, the responsiveness of the steering angle control can be improved. Similarly, the responsiveness of the steering intervention can be also improved.

A third embodiment of the present invention will be described.

Though the second embodiment provides the steering angle control section with the filter section having the FF filter, the third embodiment provides a position control section with a filter section having a FF filter.

Figure 29:
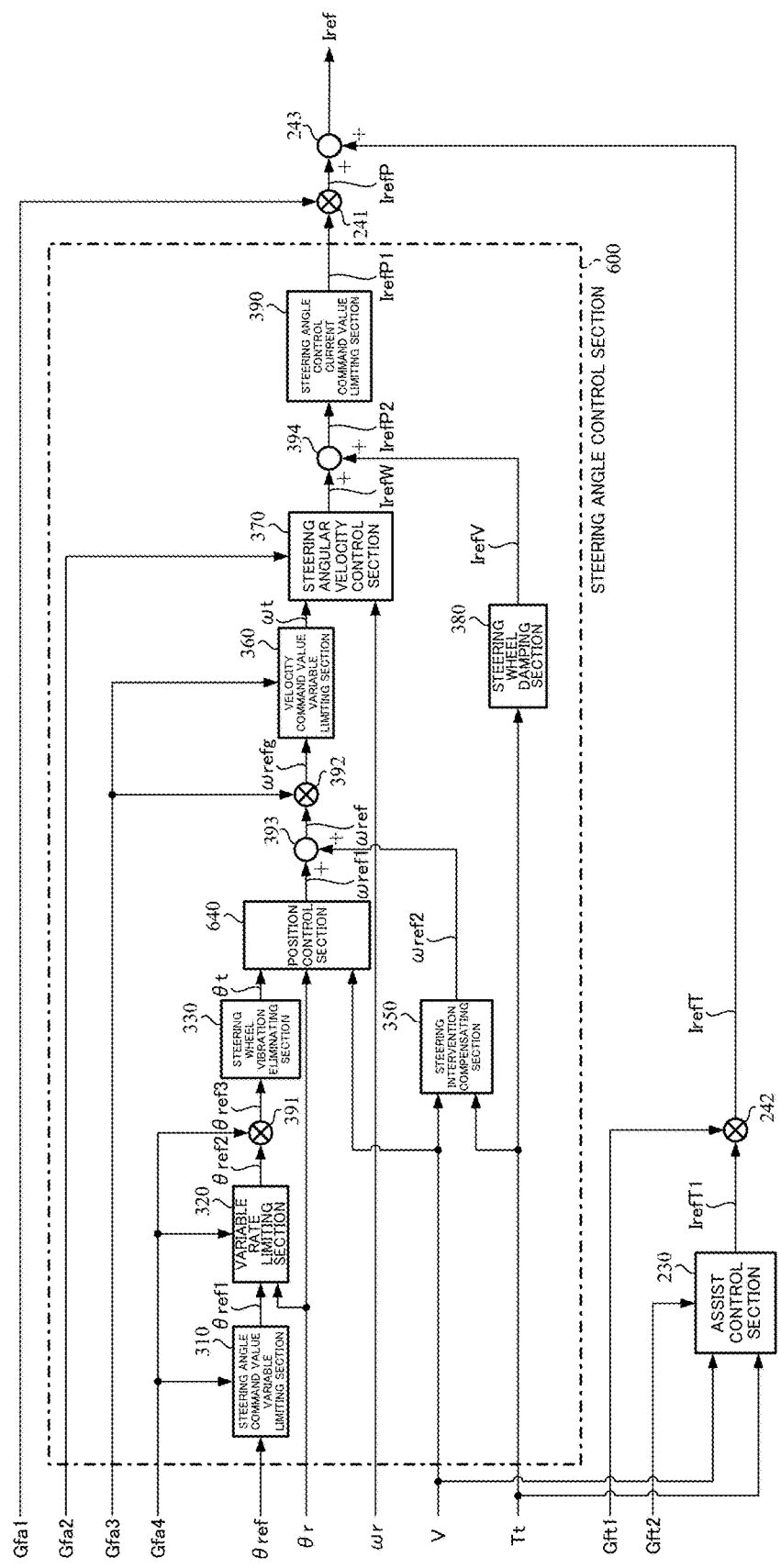
FIG. 29 is a block diagram showing a configuration example (a third embodiment) of a steering angle control section and a switching section.

A configuration example of a steering angle control section 600 in the third embodiment is shown in FIG. 29. Compared with the steering angle control section 300 in the first embodiment shown in FIG. 7, the position control section 340 is changed to a position control section 640 in the steering angle control section 600 of the third embodiment, the vehicle speed V is inputted into the position control section 640 in addition to the target steering angle θt and the actual steering angle θr. The position control section 640 calculates the steering angular velocity command value ωref1 for making the actual steering angle θr close to the target steering angle θt on the basis of the target steering angle θt and the actual steering angle θr, as with the position control section 340 of the first embodiment. However, the position control section 640 uses a reference model and an FF filter in order to extend a band where the actual steering angle θr is controlled with respect to the target steering angle θt to a high frequency side. This enables improvement of the responsiveness (the followability) of the steering angle control.

Figure 30:
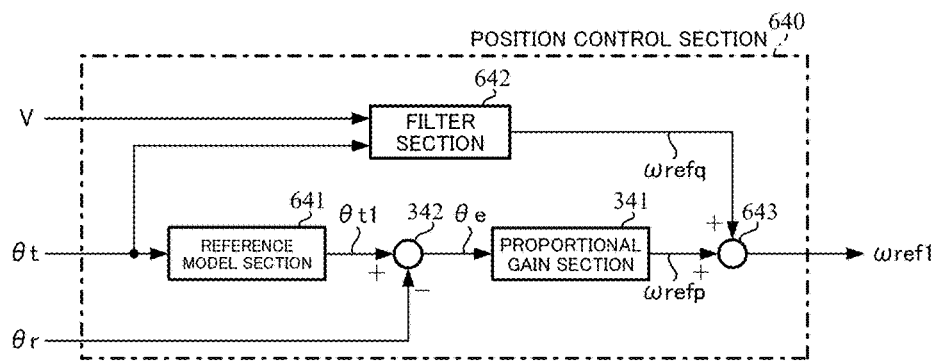
FIG. 30 is a block diagram showing a configuration example (the third embodiment) of a position control section.

A configuration example of the position control section 640 is shown in FIG. 30. The position control section 640 comprises a reference model section 641, a filter section 642, the proportional gain section 341, the subtracting section 342 and an adding section 643.

The reference model section 641 has a transfer function $G_{model}$ defined by the following expression 1, and transforms the target steering angle θt into a target steering angle θt1 by using the transfer function $G_{model}$.

$$G_{model} = \frac{1}{(T_{m1}s+1)^4(T_{m2}s+1)^2} \quad \text{[Expression 1]}$$

Here, $T_{m1}=1/(2\pi \times f_{m1})$, $T_{m2}=1/(2\pi \times f_{m2})$, $f_{m1}$ and $f_{m1}$ are cutoff frequencies, and "s" is a Laplace operator. The transfer function $G_{model}$ defines a desired transfer characteristic in a method of a model reference control. Though the order of the denominator is 6 and the order of the numerator is 0 in the above expression 1, the orders are not limited to these.

The deviation Iee between the target steering angle θt1 and the actual steering angle θr is obtained at the subtracting section 342, and the deviation θe is inputted into the proportional gain section 341. The proportional gain section 341 multiplies the deviation Iee by the proportional gain Kpp, and calculates a steering angular velocity command value ωrefp by a P-control.

The filter section 642 has the FF filter, and transforms the target steering angle θt into a steering angular velocity command value ωrefq by the FF filter. A transfer function Gf of the FF filter is defined by the following expression 2.

$$G_f = K_{ff} \frac{G_{model}}{P_{\omega\theta}} \quad \text{[Expression 2]}$$

Figure 31:
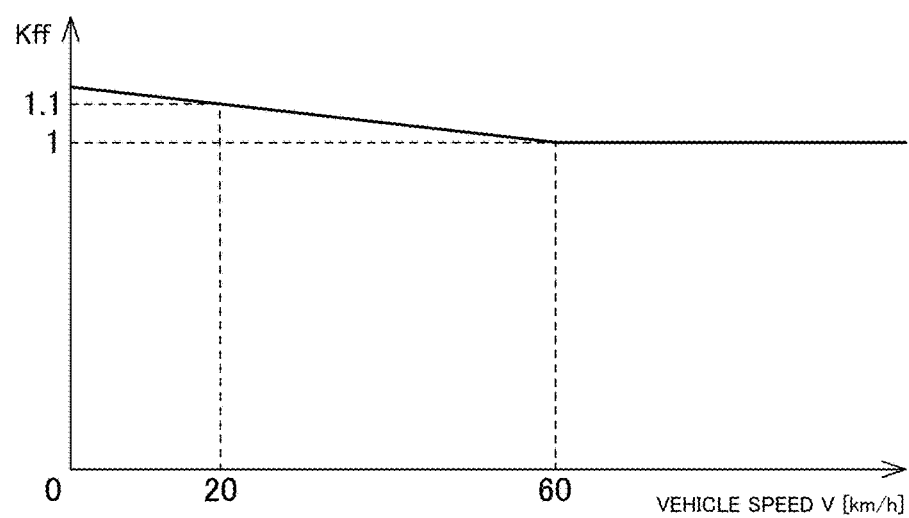
FIG. 31 is a characteristic diagram showing an example of changing an FF filter gain of the position control section with respect to a vehicle speed.

Kff is an FF filter gain. $P_{\omega\theta}$ is a transfer function from the steering angular velocity command value ωref, which is outputted from the adding section 393, to the actual steering angle θr, and is predefined by an identification by fitting, and so on. The FF filter gain Kff is changed depending on the vehicle speed V. Since the responsiveness of the actual steering angle to the steering angle command value is changed by changing a road surface reaction force and a steering intervention compensation map described below depending on the vehicle speed, the FF filter gain Kff is made vehicle speed-sensitive. This enables the responsiveness of the actual steering angle to the steering angle command value to be almost constant without depending on the vehicle speed. As shown in FIG. 31, for example, the FF filter gain Kff is changed so as to monotonically decrease as the vehicle speed V increases from 0 km/h, to become 1.1 when the vehicle speed V is 20 km/h, to become 1 when the vehicle speed V is 60 km/h, and to be kept constant at 1 after that.

The steering angular velocity command values ωrefp and ωrefq are added at the adding section 643, and the addition result is outputted as the steering angular velocity command value ωref1.

An operating example of the third embodiment is different from the operating example of the first embodiment in the operation of the position control section within the operation of the steering angle control section.

Figure 32:
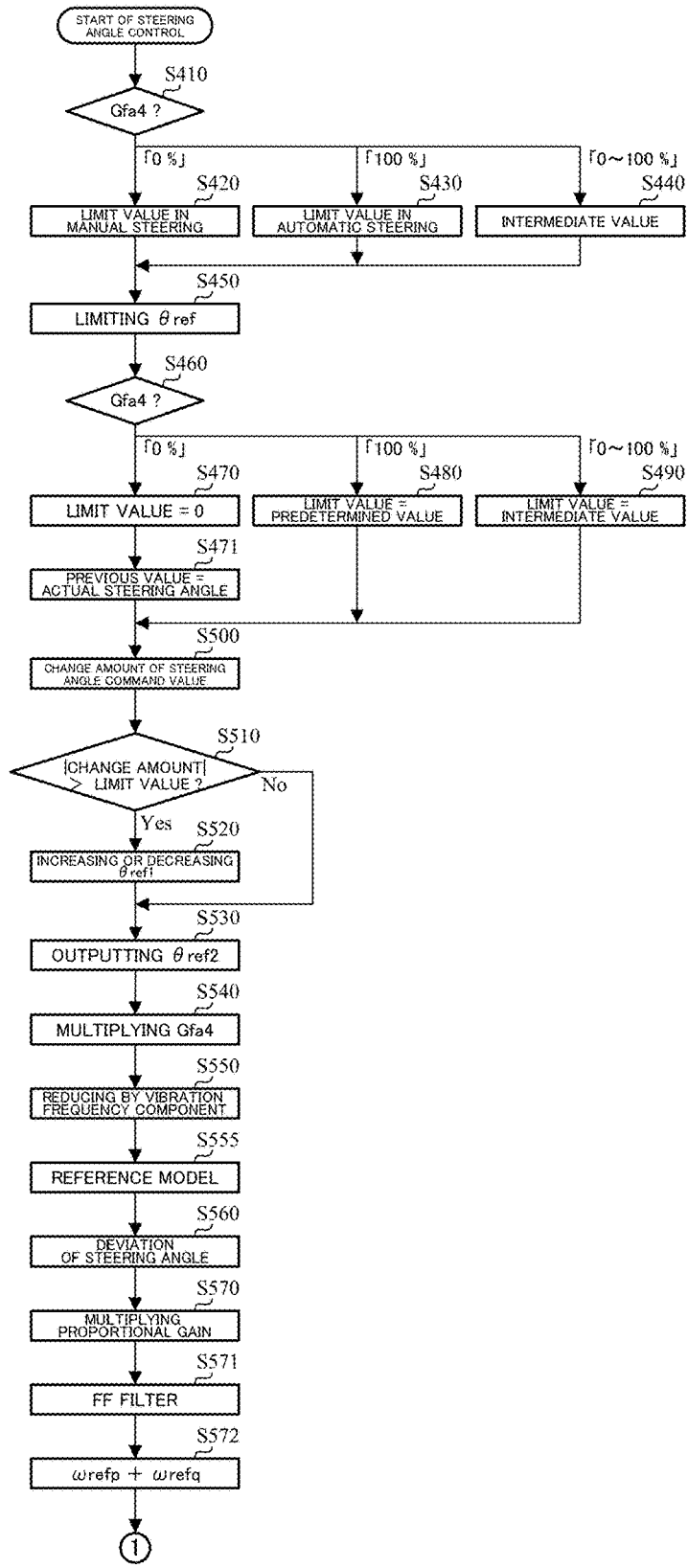
FIG. 32 is a flowchart showing a part of an operating example (the third embodiment) of the steering angle control section.
Figure 33:
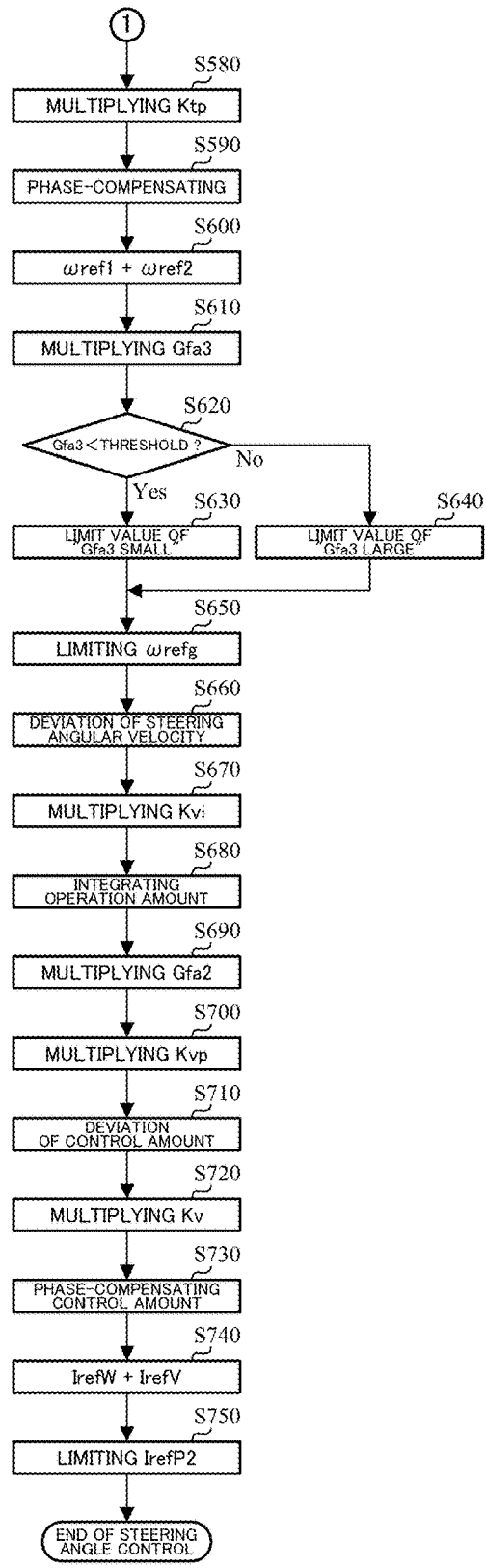
FIG. 33 is a flowchart showing a part of the operating example (the third embodiment) of the steering angle control section.

The operating example of the steering angle control section 600 is shown in FIGS. 32 and 33. The steering angle control section 600 performs the same operations as the operating example of the steering angle control section 300 of the first embodiment shown in FIGS. 18 and 19 until the step S550, and the target steering angle θt outputted from the steering wheel vibration eliminating section 330 is inputted into the position control section 640. The position control section 640 inputs the target steering angle θt into the reference model section 641 and the filter section 642. The reference model section 641 transforms the target steering angle θt into the target steering angle θt1 by using the expression 1 (Step S555). The target steering angle θt1 is addition-inputted into the subtracting section 342, the actual steering angle θr is subtraction-inputted into the subtracting section 342, and the deviation θe between the target steering angle θt1 and the actual steering angle θr is obtained (Step S560). The deviation Iee is inputted into the proportional gain section 341. The proportional gain section 341 multiplies the deviation Iee by the proportional gain Kpp, and calculates the steering angular velocity command value ωrefp (Step S570). The filter section 642 inputting the target steering angle θt inputs also the vehicle speed V, obtains the FF filter gain Kff from the vehicle speed V by using the characteristic shown in FIG. 31, and transforms the target steering angle θt into the steering angular velocity command value ωrefq by using the expression 2 (Step S571). The steering angular velocity command values ωrefp and ωrefq are added at the adding section 643 (Step S572), the steering angular velocity command value ωref1 is outputted, and the steering angular velocity command value ωref1 is inputted into the adding section 393. The operations (from Step 580) after that are the same as the first embodiment.

An effect by the reference model and the FF filter of the position control section 640 in the third embodiment will be described based on a result of a simulation.

Figure 34A:
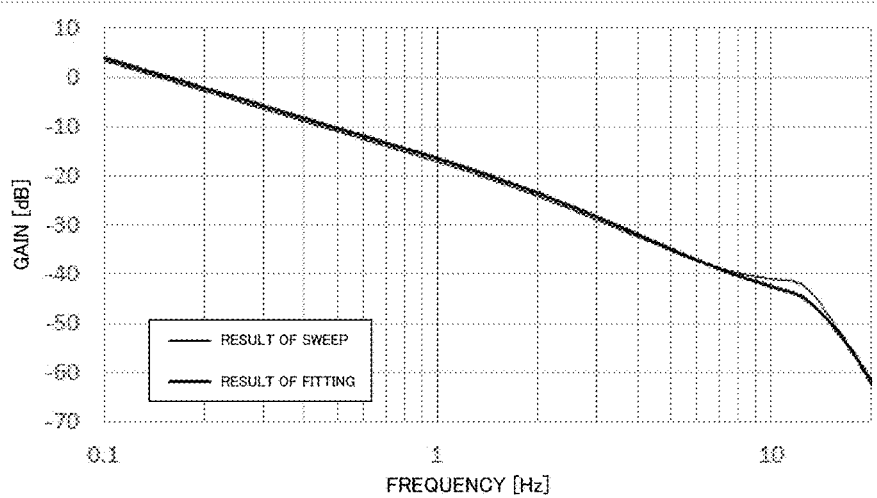
FIGS. 34A and 34B are characteristic diagrams showing an example of a frequency characteristic of a transfer function from a steering angular velocity command value to an actual steering angle in a simulation with respect to a reference model and an FF filter.
Figure 34B:
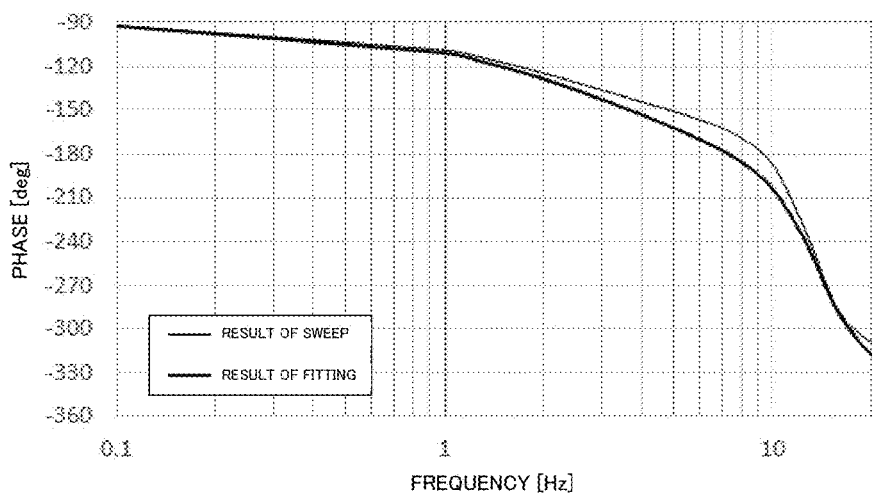

The simulation of the reference model and the FF filter of the position control section 640, first, specifies the frequency characteristic of the transfer function $P_{\omega\theta}$ from the steering angular velocity command value ωref to the actual steering angle θr by a frequency sweep or the identification by fitting with a transfer function. The result is shown in FIGS. 34A and 34B. FIG. 34A shows a gain characteristic of the transfer function $P_{\omega\theta}$, FIG. 34B shows a phase characteristic of the transfer function $P_{\omega\theta}$, the thin solid line shows the result of the frequency sweep, and the thick solid line shows the result of the fitting. Moreover, the transfer function $P_{\omega\theta}$ of the result of the fitting is the following expression 3.

$$P_{\omega\theta} = \frac{\theta r}{\omega_{ref}} = \frac{7316.2}{0.053516 s^4 + 3.4464 s^3 + 437.25 s^2 + 7316.2 s} \quad \text{[Expression 3]}$$

In the transfer function $G_{model}$ of the reference model section 641 defined by the expression 1, the cutoff frequencies $f_{m1}$ and $f_{m2}$ are set to 10 Hz and 20 Hz respectively. The transfer function Gf of the FF filter is calculated based on the expression 2. Frequency characteristics of the transfer function $G_{model}$, the transfer function $P_{\omega\theta}$ and the transfer function Gf of the FF filter are shown in FIGS. 35A and 35B under such settings. FIG. 35A shows gain characteristics, and FIG. 35B shows phase characteristics.

Since the followability of the steering angle control (the followability of the actual steering angle θr to the steering angle command value θref) can be cited as an effect by the reference model and the FF filter, a simulation of changing the steering angle command value θref from 0 [deg] to 100 [deg] in a ramp state at the vehicle speed equal to 60 [km/h] under the above settings, is performed. The result is shown in FIG. 36. In FIG. 36, the vertical axis indicates a steering angle [deg], the horizontal axis indicates a time [sec], and the broken line shows the steering angle command value θref. With respect to this steering angle command value θref, a time response of an actual steering angle calculated on the basis of a value obtained by simply multiplying a steering angle deviation (a deviation between the target steering angle θt and the actual steering angle θr) by a gain, is shown by the thin solid line, a time response of an actual steering angle calculated by the model reference control performed by the reference model and the FF filter in the position control section 640, is shown by the thick solid line, and a time response of the target steering angle θt1 outputted from the reference model section 641 is shown by a dotted line. From FIG. 36, it is found out that the followability is improved by the set reference model and FF filter, and the actual steering angle of the model reference control corresponds well with the target steering angle θt1 being an output of the reference model, compared with the result obtained by simply multiplying the gain, which is shown by the thin solid line. Though the effect by the reference model and the FF filter is shown in FIG. 36, it can be verified that the actual steering angle θr sufficiently follows the steering angle command value θref even in the case of simply multiplying the steering angle deviation by the gain (shown by the thin solid line).

Other embodiments of the present invention will be described.

Though the multiplication of the velocity control gradual change gain Gfa2 at the steering angular velocity control section 370 is performed to the control amount Ir1 outputted from the integrating section 373 in the first embodiment, it can be performed to the steering angle control current command value IrefW outputted from the subtracting section 375.

Figure 37:
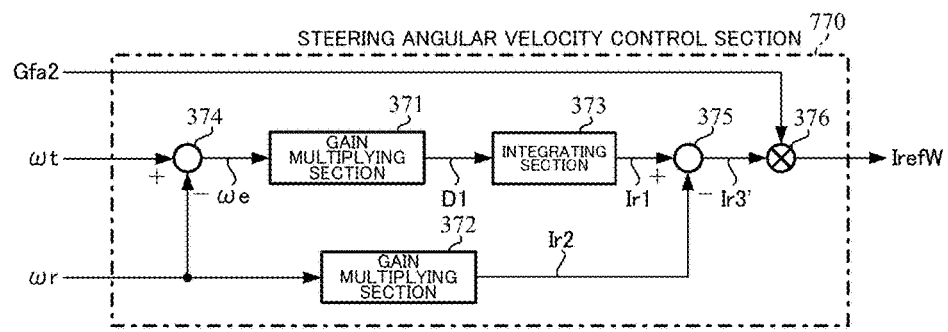
FIG. 37 is a block diagram showing a configuration example (a fourth embodiment) of a steering angular velocity control section.

FIG. 37 shows a configuration example (a fourth embodiment) of the steering angular velocity control section in the case of multiplying the steering angle control current command value IrefW by the velocity control gradual change gain Gfa2. Compared with the steering angular velocity control section 370 in the first embodiment shown in FIG. 13, in a steering angular velocity control section 770 of the fourth embodiment, the multiplying section 376 is provided not behind the integrating section 373 but behind the subtracting section 375, and the other configurations are the same.

Figure 18:
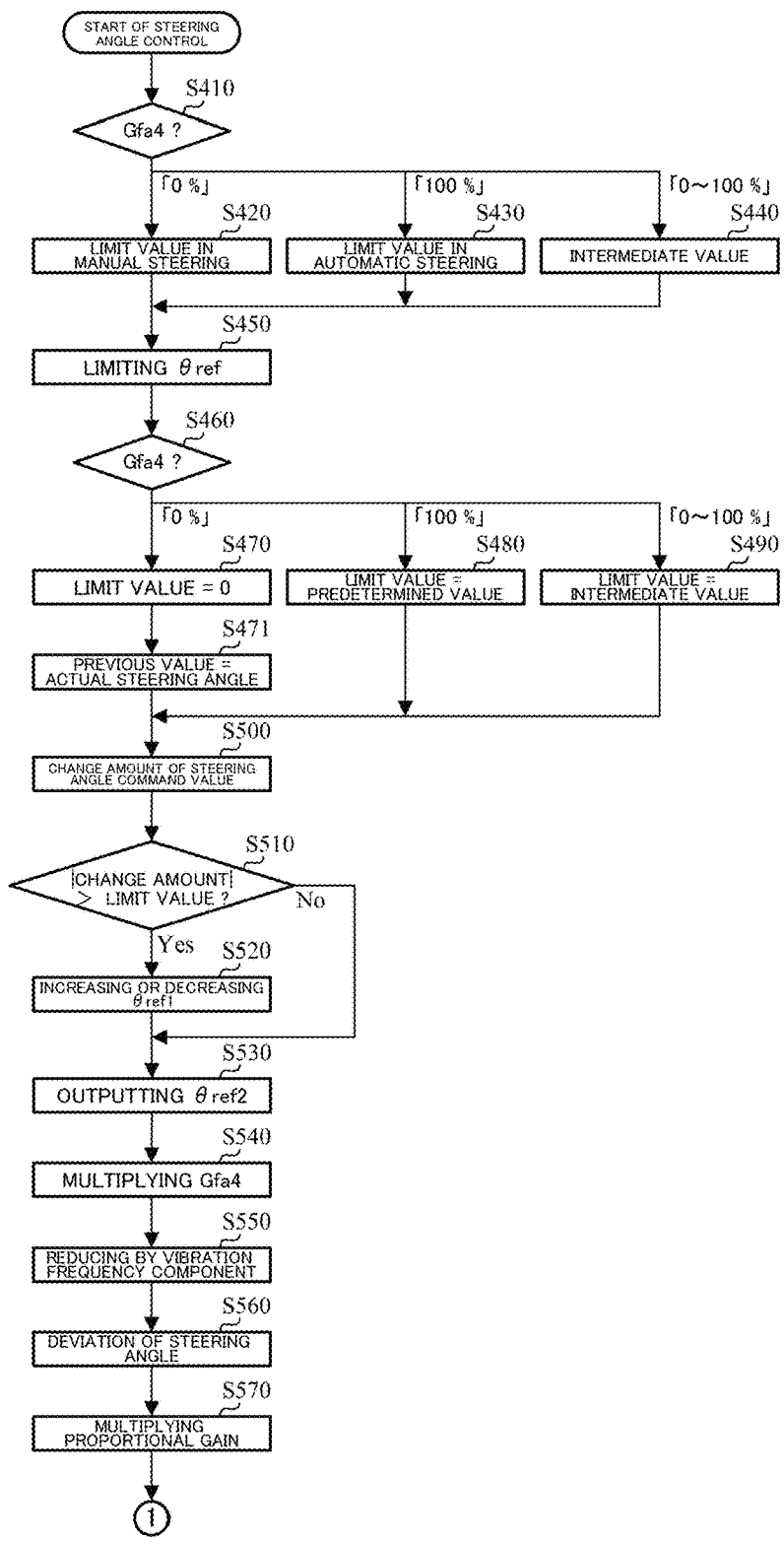
FIG. 18 is a flowchart showing a part of an operating example (the first embodiment) of the steering angle control section.
Figure 19:
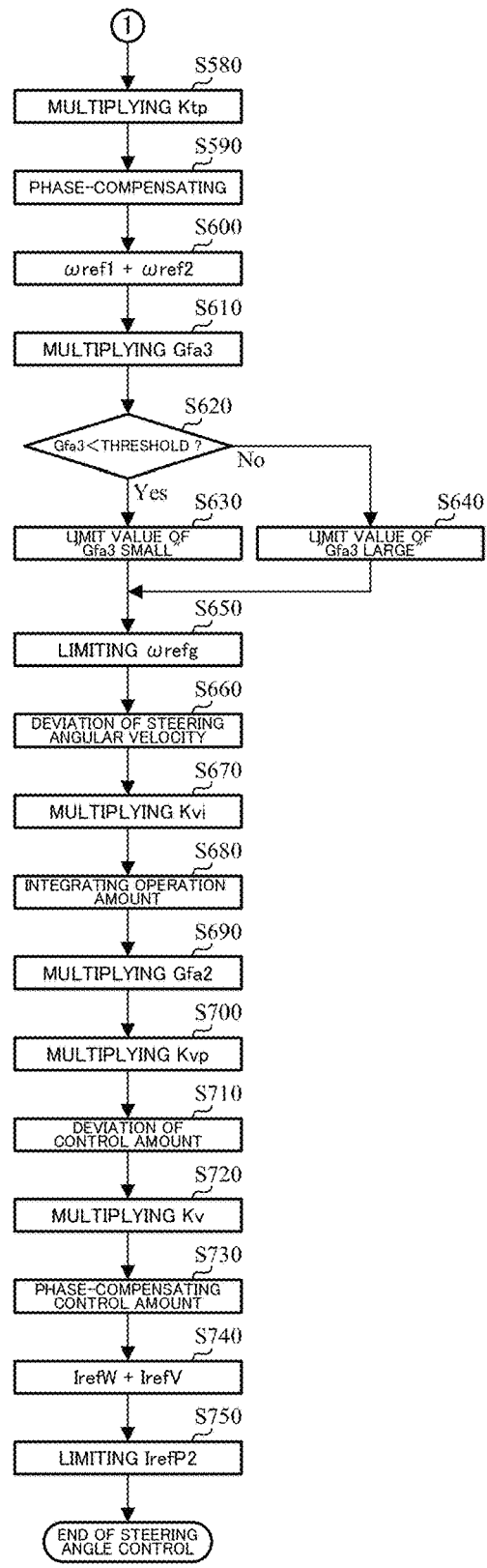
FIG. 19 is a flowchart showing a part of the operating example (the first embodiment) of the steering angle control section.

An operating example of the steering angular velocity control section 770 in the fourth embodiment performs the same operations as the operating example of the first embodiment shown in FIGS. 18 and 19 until the step S680 where the integrating section 373 integrates the operation amount D1 and calculates the control amount Ir1, after that, the control amount Ir1 is inputted into the subtracting section 375, and a control amount Ir3' is calculated as a deviation (Ir1−Ir2) between the control amounts Ir1 and Ir2. The multiplying section 376 multiplies the control amount Ir3' by the velocity control gradual change gain Gfa2, and outputs the multiplication result as the steering angle control current command value IrefW to the adding section 394. The operations (from Step 720) after that are the same as the first embodiment.

It is possible to perform the multiplication of the velocity control gradual change gain Gfa2 at another position in the steering angular velocity control section 370.

Figure 38:
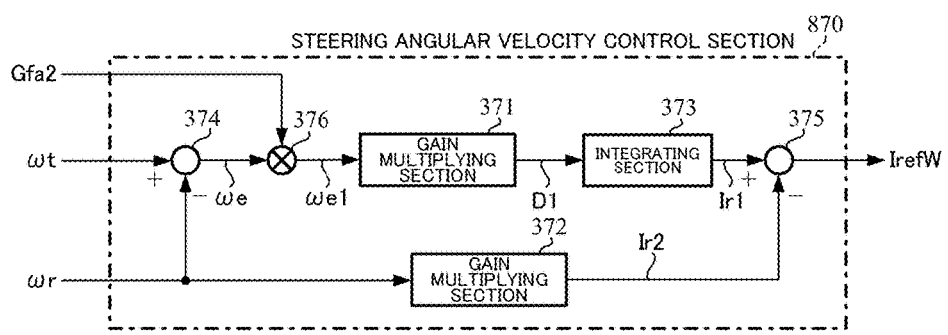
FIG. 38 is a block diagram showing a configuration example (a fifth embodiment) of a steering angular velocity control section.

A configuration example (a fifth embodiment) of a steering angular velocity control section shown in FIG. 38 multiplies the deviation ωe outputted from the subtracting section 374 by the velocity control gradual change gain Gfa2. Compared with the steering angular velocity control section 370 in the first embodiment shown in FIG. 13, in a steering angular velocity control section 870 of the fifth embodiment, the multiplying section 376 is provided not behind the integrating section 373 but behind the subtracting section 374, and the other configurations are the same.

An operating example of the steering angular velocity control section 870 in the fifth embodiment performs the same operations as the operating example of the first embodiment shown in FIGS. 18 and 19 until the step S660 where the subtracting section 374 calculates the deviation ωe between the target steering angular velocity ωt and the actual steering angular velocity ωr, and the deviation ωe is inputted into not the gain multiplying section 371 but the multiplying section 376. The multiplying section 376 multiplies the deviation ωe by the velocity control gradual change gain Gfa2, and outputs the multiplication result as a deviation ωe1 to the gain multiplying section 371. The operations after that are the same as the first embodiment except to remove the step S690.

Figure 39:
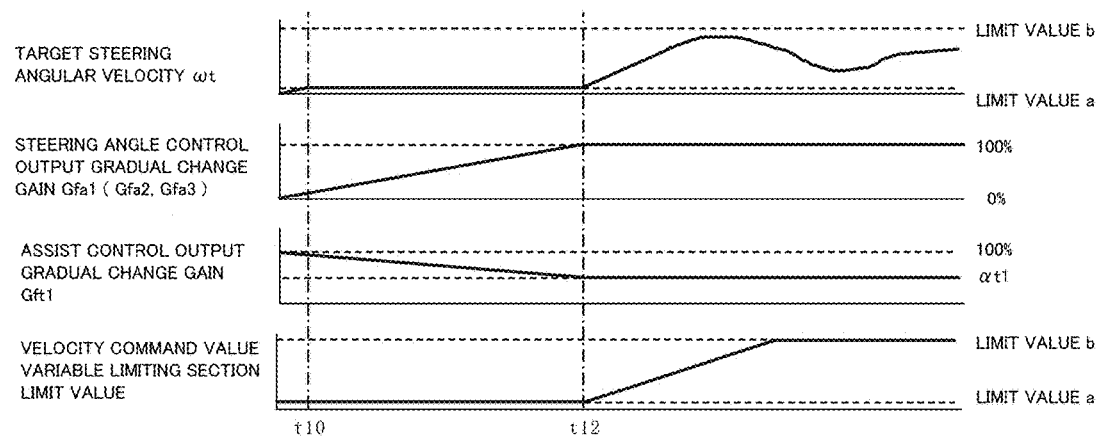
FIG. 39 is a graph showing an example (a sixth embodiment) of changing a target steering angular velocity, gradual change gains and a limit value in the case of transferring a steering state.

In the above embodiments (the first to the fifth embodiments), the velocity command value variable limiting section 360 sets the limit values depending on the velocity command gradual change gain Gfa3, and switches the limit values when the Gfa3 becomes the predetermined threshold. However, a velocity command value variable limiting section uses the steering angle control output gradual change gain Gfa1 instead of the Gfa3, and may switch the limit values when the Gfa1 becomes 100%. In a configuration (a sixth embodiment) of this case, the Gfa1 is inputted into the velocity command value variable limiting section instead of the Gfa3, and the other configurations are the same as the other embodiments. In an operation of the sixth embodiment, a judgment operation of determining limit values at the velocity command value variable limiting section (the step S620 shown in FIG. 19) is changed to a confirmation of whether or not the Gfa1 is smaller than 100%. In the sixth embodiment, time changes of the target steering angular velocity ωt, the gradual gains and the limit value of the velocity command value variable limiting section in the case of changing the state from the manual steering state to the automatic steering state, become as shown in FIG. 39. Compared with the time changes shown in FIG. 25, the limit value of the velocity command value variable limiting section gradually increases from the time point t12 where the Gfa1 becomes 100%, and the target steering angular velocity ωt also increases correspondingly.

EXPLANATION OF REFERENCE NUMERALS

1 steering wheel
2 column shaft (steering shaft, handle shaft)
10 torque sensor
12 vehicle speed sensor
20 motor
21 rotational angle sensor
30 control unit (ECU)
31 current command value calculating section
33 current limiting section
34 compensation signal generating section
35 PI-control section
36 PWM-control section
37 inverter
38 motor current detector
100 vehicle-side-ECU
110 vehicle state quantity detecting section
120 switch command section
130 target track calculating section
140 vehicle motion control section
141 steering angle command value generating section
200 EPS-side-ECU
210 EPS state quantity detecting section 220 switch judging and gradual change gain generating section
221 switch judging section
222 gradual change gain generating section
223 manual input judging section
224 steering state judging section
225 smoothing filter section
226 absolute value processing section
227 judgment processing section
230 assist control section
240 switching section
250 current control and driving section
300, 500, 600 steering angle control section
310 steering angle command value variable limiting section
320 variable rate limiting section
330 steering wheel vibration eliminating section
340, 640 position control section
341 proportional gain section
350 steering intervention compensating section
351 compensation gain section
352 steering intervention phase compensating section
360 velocity command value variable limiting section
370, 770, 870 steering angular velocity control section
371, 372 gain multiplying section
373 integrating section
380 steering wheel damping section
381 gain section
382 damping phase compensating section
390 steering angle control current command value limiting section
400 plant
555, 642 filter section
641 reference model section

The invention claimed is:

1. An electric power steering apparatus that drives a motor based on a current command value, and performs assist control and steering angle control to a steering system by driving and controlling said motor, comprising:
   a steering angle control section that calculates a steering angle control current command value for said steering angle control based on at least a steering angle command value and an actual steering angle;
   wherein said steering angle control section comprises
   a position control section that calculates a basic steering angular velocity command value based on said steering angle command value and said actual steering angle,
   a steering intervention compensating section that obtains a compensatory steering angular velocity command value for steering intervention compensation depending on a steering torque, and
   a steering angular velocity control section that calculates said steering angle control current command value based on a steering angular velocity command value calculated by using said basic steering angular velocity command value and said compensatory steering angular velocity command value and an actual steering angular velocity;
   wherein said steering intervention compensating section comprises a compensation gain section that multiplies said steering torque by a steering intervention compensation gain, and said steering intervention compensating section obtains said compensatory steering angular velocity command value by said steering torque through said compensation gain section; and
   wherein said electric power steering apparatus calculates said current command value using at least said steering angle control current command value.

2. The electric power steering apparatus according to claim 1,
   wherein said steering angle control section further comprises a filter section that transforms said steering angular velocity command value into an extended steering angular velocity command value using an FF filter; and
   wherein said steering angular velocity control section calculates said steering angle control current command value based on said extended steering angular velocity command value and said actual steering angular velocity.

3. The electric power steering apparatus according to claim 2,
   wherein said position control section comprises a proportional gain section that calculates said basic steering angular velocity command value by multiplying a deviation between said steering angle command value and said actual steering angle by a proportional gain.

4. The electric power steering apparatus according to claim 2,
   wherein said steering intervention compensating section further comprises a steering intervention phase compensating section that performs phase compensation to said steering angular velocity command value obtained from said steering torque, and
   said steering intervention compensating section obtains said compensatory steering angular velocity command value by said steering torque through said compensation gain section and said steering intervention phase compensating section.

5. The electric power steering apparatus according to claim 2,
   wherein said electric power steering apparatus further comprises an assist control section that calculates an assist control current command value for said assist control based on at least said steering torque, and
   said electric power steering apparatus calculates said current command value by said assist control current command value and said steering angle control current command value.

6. The electric power steering apparatus according to claim 2,
   wherein said steering angle control section further comprises a steering angle control current command value limiting section that limits said steering angle control current command value by a preset limit value.

7. The electric power steering apparatus according to claim 1,
   wherein said position control section comprises a proportional gain section that calculates said basic steering angular velocity command value by multiplying a deviation between said steering angle command value and said actual steering angle by a proportional gain.

8. The electric power steering apparatus according to claim 1,
   wherein said position control section comprises
   a reference model section that transforms said steering angle command value into a target steering angle using a reference model,
   a proportional gain section that calculates a first steering angular velocity command value by multiplying a deviation between said target steering angle and said actual steering angle by a proportional gain, and
   a filter section that transforms said steering angle command value into a second steering angular velocity command value using an FF filter, and said position control section calculates said basic steering angular velocity command value by adding said second steering angular velocity command value to said first steering angular velocity command value.

9. The electric power steering apparatus according to claim 8,
wherein said steering intervention compensating section further comprises a steering intervention phase compensating section that performs phase compensation to said steering angular velocity command value obtained from said steering torque, and
said steering intervention compensating section obtains said compensatory steering angular velocity command value by said steering torque through said compensation gain section and said steering intervention phase compensating section.

10. The electric power steering apparatus according to claim 8,
wherein said electric power steering apparatus further comprises an assist control section that calculates an assist control current command value for said assist control based on at least said steering torque, and
said electric power steering apparatus calculates said current command value by said assist control current command value and said steering angle control current command value.

11. The electric power steering apparatus according to claim 8,
wherein said steering angle control section further comprises a steering angle control current command value limiting section that limits said steering angle control current command value by a preset limit value.

12. The electric power steering apparatus according to claim 1, wherein said steering intervention compensation gain decreases as a vehicle speed increases.

13. The electric power steering apparatus according to claim 1,
wherein said steering intervention compensating section further comprises a steering intervention phase compensating section that performs phase compensation to said steering angular velocity command value obtained from said steering torque, and
said steering intervention compensating section obtains said compensatory steering angular velocity command value by said steering torque through said compensation gain section and said steering intervention phase compensating section.

14. The electric power steering apparatus according to claim 1,
wherein said steering angular velocity control section calculates said steering angle control current command value by an I-P control.

15. The electric power steering apparatus according to claim 1,
wherein said electric power steering apparatus further comprises an assist control section that calculates an assist control current command value for said assist control based on at least said steering torque, and
said electric power steering apparatus calculates said current command value by said assist control current command value and said steering angle control current command value.

16. The electric power steering apparatus according to claim 15,
wherein said electric power steering apparatus multiplies said assist control current command value by an assist control output gradual change gain to adjust said assist control current command value.

17. The electric power steering apparatus according to claim 16,
wherein said electric power steering apparatus performs only said steering angle control to said steering system by multiplying said assist control current command value by said assist control output gradual change gain whose value is zero.

18. The electric power steering apparatus according to claim 15,
wherein said electric power steering apparatus multiplies an assist map output current obtained in said assist control section by an assist map gradual change gain.

19. The electric power steering apparatus according to claim 1,
wherein said steering angle control section further comprises a steering angle control current command value limiting section that limits said steering angle control current command value by a preset limit value.

* * * * *